(12) United States Patent
Liu et al.

(10) Patent No.: US 8,769,283 B2
(45) Date of Patent: Jul. 1, 2014

(54) MTC DEVICE AUTHENTICATION METHOD, MTC GATEWAY, AND RELATED DEVICE

(75) Inventors: Xiaohan Liu, Shenzhen (CN); Yixian Xu, Beijing (CN); Yingxin Huang, Beijing (CN); Lijia Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 13/560,187

(22) Filed: Jul. 27, 2012

(65) Prior Publication Data

US 2012/0297193 A1 Nov. 22, 2012

Related U.S. Application Data

(63) Continuation of application No. PCT/CN2011/070654, filed on Jan. 26, 2011.

(30) Foreign Application Priority Data

Jan. 29, 2010 (CN) .......................... 2010 1 0104936

(51) Int. Cl.
*H04L 9/00* (2006.01)
(52) U.S. Cl.
USPC ........... 713/169; 713/155; 713/168; 713/182; 726/4; 726/12; 380/45; 380/278; 455/411; 455/419
(58) Field of Classification Search
USPC ................ 713/155, 168, 169, 182; 726/4, 12; 380/45, 278; 455/411, 419
See application file for complete search history.

(56) References Cited

U.S. PATENT DOCUMENTS

| | | | | |
|---|---|---|---|---|
| 2006/0200678 | A1* | 9/2006 | Yamada et al. | 713/182 |
| 2008/0285749 | A1* | 11/2008 | Suh et al. | 380/45 |
| 2008/0298595 | A1* | 12/2008 | Narayanan et al. | 380/278 |
| 2008/0311906 | A1* | 12/2008 | Suh et al. | 455/435.1 |
| 2009/0054037 | A1* | 2/2009 | Kaippallimalil | 455/411 |

(Continued)

FOREIGN PATENT DOCUMENTS

| | | |
|---|---|---|
| CN | 1953371 | 4/2007 |
| CN | 101056456 | 10/2007 |

(Continued)

OTHER PUBLICATIONS

International Search Report dated May 26, 2011 in corresponding International Patent Application No. PCT/CN2011/070654.

(Continued)

*Primary Examiner* — Beemnet Dada
*Assistant Examiner* — Sayed Beheshti Shirazi
(74) *Attorney, Agent, or Firm* — Staas & Halsey LLP

(57) ABSTRACT

Embodiments of the present invention provide an MTC device authentication method, an MTC gateway, and a related device, which are used to solve a problem that direct interaction between a large quantity of MTC devices and a network side brings a heavy load to a network when the MTC devices are authenticated in the prior art. The method includes: performing, by an MTC gateway, mutual authentication with a core network node; performing, by the MTC gateway, mutual authentication with an MTC device; reporting, by the MTC gateway, a result of the mutual authentication with the MTC device to the core network node; and providing, by the MTC gateway, a non access stratum link protection key K between the MTC device and the core network node according to a key K1 or a key K2.

12 Claims, 18 Drawing Sheets

(56) References Cited

U.S. PATENT DOCUMENTS

| | | | |
|---|---|---|---|
| 2009/0191857 A1* | 7/2009 | Horn et al. | 455/419 |
| 2011/0023094 A1* | 1/2011 | Yang et al. | 726/4 |
| 2011/0258447 A1* | 10/2011 | Wei et al. | 713/168 |
| 2011/0289314 A1* | 11/2011 | Whitcomb | 713/155 |

FOREIGN PATENT DOCUMENTS

| | | |
|---|---|---|
| CN | 101094065 A | 12/2007 |
| CN | 101198148 A | 6/2008 |
| CN | 101304319 | 11/2008 |
| CN | 101578828 | 11/2009 |
| EP | 1209874 | 5/2005 |
| EP | 1811744 | 7/2007 |
| JP | 8-511928 | 12/1996 |
| JP | 2001237818 | 8/2001 |
| JP | 2001306519 | 11/2001 |
| JP | 2002271309 | 9/2002 |
| JP | 2003218954 | 7/2003 |
| JP | 2005160005 | 6/2005 |
| JP | 2006303791 | 11/2006 |
| JP | 2008236754 | 10/2008 |
| JP | 2009-524369 | 6/2009 |
| JP | 2010251974 | 11/2010 |
| WO | 95/04416 | 2/1995 |
| WO | WO2010/094206 | 8/2010 |

OTHER PUBLICATIONS

Written Opinion of the International Searching Authority issued May 26, 2011 in corresponding International Patent Application No. PCT/CN2011/070654.

Extended European Search Report issued Feb. 2, 2013, in corresponding European Patent Application No. 11736633.6.

Japanese Office Action mailed Oct. 29, 2013 in corresponding Japanese Patent Application No. 2012-550312.

"A Study of a Fast User Authentication Protocol for Wireless Internet Applications", Park et al., Information Technology R&D Center, Mitsubishi Electric Corporation, Faculty of Engineering, University of Miyazaki, Oct. 2004, pp. 313-318.

"Security Technology for Realizing SAE/LTE", Zugenmaier et al, NTT DOCOMO Technical Journal, The Telecommunications Association' Oct. 2009, vol. 17, No. 3, pp. 1-4, 27-30.

Chinese Search Report mailed Mar. 28, 2013 for corresponding Chinese Application No. 2010101049360.

3GPP, "Proposal on MTC Architectural Baseline for GPRS system and EPS", Huawei, TSG, SA WG2 Meeting #76, Nov. 16-20, 2009, TD S2-097391, pp. 1-4.

International Search Report of Corresponding PCT Application PCT/CN2011/070654 mailed May 26, 2011.

* cited by examiner

MTC DEVICE AUTHENTICATION METHOD, MTC GATEWAY, AND RELATED DEVICE

CROSS-REFERENCE TO RELATED APPLICATIONS

This application is a continuation of International Application No. PCT/CN2011/070654, filed on Jan. 26, 2011, which claims priority to Chinese Patent Application No. 201010104936.0, filed on Jan. 29, 2010, both of which are hereby incorporated by reference in their entireties.

FIELD OF THE INVENTION

The present invention relates to the field of wireless communication, and in particular, to an MTC device authentication method, an MTC device gateway, and a related device.

BACKGROUND OF THE INVENTION

A machine to machine (M2M, Machine to Machine) technology is integration of wireless communication and information technology, is used for two-way communication, and applies to fields such as security monitoring and detection, vending machines, and cargo tracking. According to a communication object, M2M may be divided to three communication modes: machine to machine, machine to mobile terminal (such as remote user monitoring), and mobile terminal to machine (such as remote user control). In M2M communication, an M2M device accessing a network is also called a machine type communication (MTC, Machine Type Communication) device.

Generally speaking, in a system supporting the M2M communication, the quantity of MTC devices is huge. If each MTC device is authenticated directly according to an authentication method in the prior art, there is a large quantity of signaling interaction in an authentication process between each MTC device and a network side. This kind of signaling traffic generated when a large quantity of MTC devices access a network and perform authentication is not ignorable to the network side. In addition, a large quantity of authentication processes consume a processing capability of the network side. These all bring a heavy load to the network.

SUMMARY OF THE INVENTION

Embodiments of the present invention provide an MTC device authentication method, an MTC gateway, and a related device, which are used to solve a problem that direct interaction between a large quantity of MTC devices and a network side brings a heavy load to a network when the MTC devices are authenticated in the prior art.

An MTC device authentication method includes: performing, by an MTC gateway, mutual authentication with a core network node; performing, by the MTC gateway, mutual authentication with an MTC device; reporting, by the MTC gateway, a result of the mutual authentication with the MTC device to the core network node; and providing, by the MTC gateway, a non access stratum link protection key K between the MTC device and the core network node according to a key K1 or a key K2, where the key K1 is a key generated in a process of the mutual authentication performed by the MTC gateway with the core network node, and the key K2 is a non access stratum key derived by the MTC gateway according to a key algorithm A1 and the key K1.

An MTC device authentication method includes: performing, by a core network node, mutual authentication with an MTC gateway; receiving, by the core network node, a result which is of mutual authentication between the MTC gateway and an MTC device and sent by the MTC gateway; and providing, by the core network node, a non access stratum link protection key K between the MTC device and the core network node according to a key K1 or a key K2, where the key K1 is a key generated in a process of the mutual authentication performed by the core network node with the MTC gateway, and the key K2 is a non access stratum key derived by the core network node according to a key algorithm A1 and the key K1.

An MTC device authentication method includes: performing, by an MTC device, mutual authentication with an MTC gateway; and obtaining, by the MTC device, a non access stratum link protection key K between the MTC device and a core network node after the MTC gateway performs mutual authentication with the core network node and reports a result of the mutual authentication performed with the MTC device to the core network node.

A gateway includes: an authenticating module, configured to perform mutual authentication with a core network node and perform mutual authentication with an MTC device; a reporting module, configured to report a result of the mutual authentication between the authenticating module and the MTC device to the core network node; and a key providing module, configured to provide a non access stratum link protection key K between the MTC device and the core network node according to a key K1 or a key K2, where the key K1 is a key generated in a process of the mutual authentication performed by the authenticating module with the core network node, and the key K2 is a non access stratum key derived by the MTC gateway according to a key algorithm A1 and the key K1.

A core network node includes: an authenticating module, configured to perform mutual authentication with an MTC gateway; a receiving module, configured to receive a result of mutual authentication between the MTC gateway and an MTC device; and a key providing module, configured to provide a non access stratum link protection key K between the MTC device and the core network node according to a key K1 or a key K2.

An MTC device includes: an authenticating module, configured to perform mutual authentication with an MTC gateway; and a key obtaining module, configured to obtain a non access stratum link protection key K between the MTC device and a core network node according to a key K1 or a key K2 after the MTC gateway performs mutual authentication with the core network node and reports a result of the mutual authentication performed with the authenticating module to the core network node, where the key K2 is a non access stratum key derived according to the key K1 when the MTC gateway performs the mutual authentication with the core network node, and the key K1 is generated in a process of the mutual authentication between the MTC gateway and the core network node.

In the embodiments of the present invention, the core network node performs mutual authentication with the MTC gateway directly, and then the MTC gateway performs mutual authentication with an MTC device group connected to it and reports an authentication result to the core network node. Because the core network node only performs mutual authentication directly with the MTC gateway, and actually, the mutual authentication between the core network node and the MTC device is completed by the MTC gateway as an agent, this manner objectively reduces signaling traffic caused by direct mutual authentication between the core network node and the MTC device. Compared with the prior art, this actually reduces a link load of the network, and an access stratum function between the MTC device and a radio access network (RAN, Radio Access Network) node is implemented through the MTC gateway, while the MTC device only implements a non access stratum function with the core network node, which also reduces the cost of the MTC device.

DETAILED DESCRIPTION OF THE EMBODIMENTS

The technical solutions in the embodiments of the present invention are described clearly and completely below with reference to the accompanying drawings in the embodiments of the present invention. Apparently, the embodiments to be described are merely part of rather than all of the embodiments of the present invention. All other embodiments obtained by persons of ordinary skill in the art based on the embodiments of the present invention without making creative efforts shall fall within the protection scope of the present invention.

Figure 1:
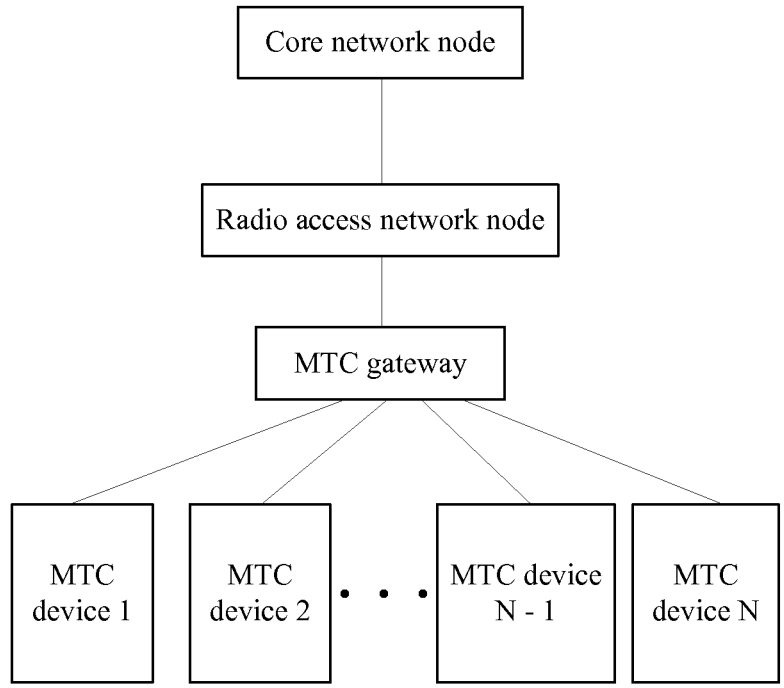
FIG. 1 is a schematic diagram of accessing a core network by MTC devices according to an embodiment of the present invention.

FIG. 1 is a schematic diagram of accessing a core network by MTC devices according to a first embodiment of the present invention. In this embodiment, MTC devices 1 to N form an MTC device group (Group). The MTC group is connected to an MTC gateway. The MTC gateway accesses the core network through a radio access network (RAN, Radio Access Network) node. In all the embodiments of the present invention, the technical solutions of the present invention are described based on this networking structure.

In the first embodiment, the MTC gateway is different from the MTC devices in the MTC device group, and it may be a special MTC device used to manage the MTC devices which are in the MTC device group and connected to it, and has an access stratum (AS, Access Stratum) function with the RAN node. An MTC device in the MTC device group only has a non access stratum (NAS, Non Access Stratum) function with a core network node, and may not have an AS function with the RAN node. With such a hierarchical mode, an authentication manner of the present invention may be different from that provided in the prior art. For example, in the present invention, it may be segmented authentication, separate generation of a NAS key and an AS key, and separate implementation of NAS link protection and AS link protection and so on, which are respectively described below.

Figure 2:
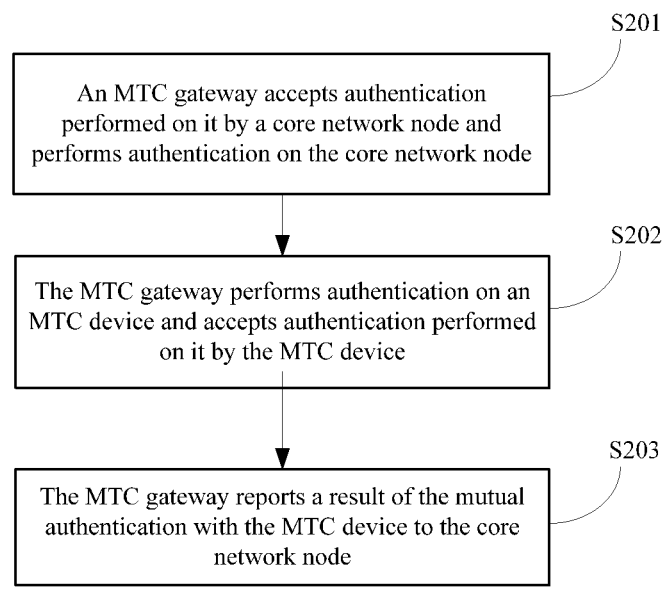
FIG. 2 is a basic schematic flowchart of a method for mutual authentication between an MTC device and a network side according to an embodiment of the present invention.

FIG. 2 is a basic schematic flowchart of a method for mutual authentication between a network side and an MTC device according to the first embodiment of the present invention, where the method mainly includes the following steps:

S201: An MTC gateway accepts authentication performed on it by a core network node and performs authentication on the core network node.

In the embodiment of the present invention, the core network node is a mobility management entity (MME, Mobile Management Entity) or a serving GPRS support node (SGSN, Serving GPRS Support Node), and is located on the network side. The MTC gateway performs mutual authentication with the core network node, and an authentication manner may be an authentication and key agreement (Authentication and Key Agreement, AKA) or a certificate. Considering compatibility with an existing system, the AKA manner may be preferentially used for the mutual authentication. If the AKA manner is used for the authentication, an identity used in an authentication process may be a group identity of an MTC device group managed by the MTC gateway or an international mobile subscriber identity (IMSI, International Mobile Subscriber Identity) of the MTC gateway, and a used key is a basic key corresponding to the identity. Because the core network node does not perform mutual authentication with the MTC device directly, if the mutual authentication between the MTC gateway and the core network node fails, the MTC gateway needs to notify the MTC device group connected to it that a session key is invalid. For a trigger condition of the mutual authentication, in this embodiment, the authentication process may be triggered according to all trigger conditions in an existing protocol, and the mutual authentication between the MTC gateway and the core network node may also be triggered when the MTC device group is updated (for example, an MTC device is added or deleted).

S202: The MTC gateway performs authentication on the MTC device and accepts authentication performed on it by the MTC device.

The method in this embodiment is based on the MTC device networking structure in the embodiment shown in FIG. 1, where MTC devices are connected to the MTC gateway. The MTC gateway performs mutual authentication with the MTC device, and an authentication manner may be an AKA, an extensible authentication protocol-AKA (EAP-AKA, Extensible Authentication Protocol-AKA), AKA or a digital certificate, and so on. This is not limited in the present invention.

S203: The MTC gateway reports a result of the mutual authentication with the MTC device to the core network node.

Because the core network node does not perform mutual authentication with the MTC device directly, the MTC gateway needs to report the result of the mutual authentication between it and the MTC device to the core network node. Only after whether mutual authentication between the MTC gateway and one or some certain MTC devices is successful is acquired, the core network node may perform a subsequent procedure.

It should be noted that, in this embodiment, besides an authentication credential for itself to access the core network, the MTC gateway also has an authentication credential to manage every MTC device in the MTC device group and other security related information. The MTC gateway may store security management related data such as these authentication credentials or other security related information through a reliable secure environment (for example, a TrE). Once a change occurs in the MTC device group, the MTC gateway may update the security management related data through manners such as open mobile alliance device management (OAM DM, Open Mobile Alliance Device Management) or synchronization with a network side network element (for example, an HSS, an EIR, and an OAM server).

In the foregoing embodiment of the present invention, although the core network node (network side) does not perform mutual authentication with the MTC device directly, the MTC gateway, as an agent, completes the mutual authentication with the core network node and the mutual authentication with the MTC devices in the group, and reports an authentication result to the core network node, so that the mutual authentication between the core network node and the MTC device group is completed indirectly. Because the core network node only performs direct mutual authentication with the MTC gateway, the mutual authentication between the core network node and the MTC device is actually completed by the MTC gateway as an agent. This manner objectively reduces signaling traffic caused by direct mutual authentication between the core network node and the MTC device. Compared with the prior art, this actually reduces a link load of the network side.

In this embodiment of the present invention, both NAS link protection between the MTC device and the core network node and AS link protection between the MTC device and the RAN node are performed through keys. A method for generating these two types of protocol layer link protection keys is described in the following through embodiments by respectively taking a NAS and an AS as examples.

Figure 3:
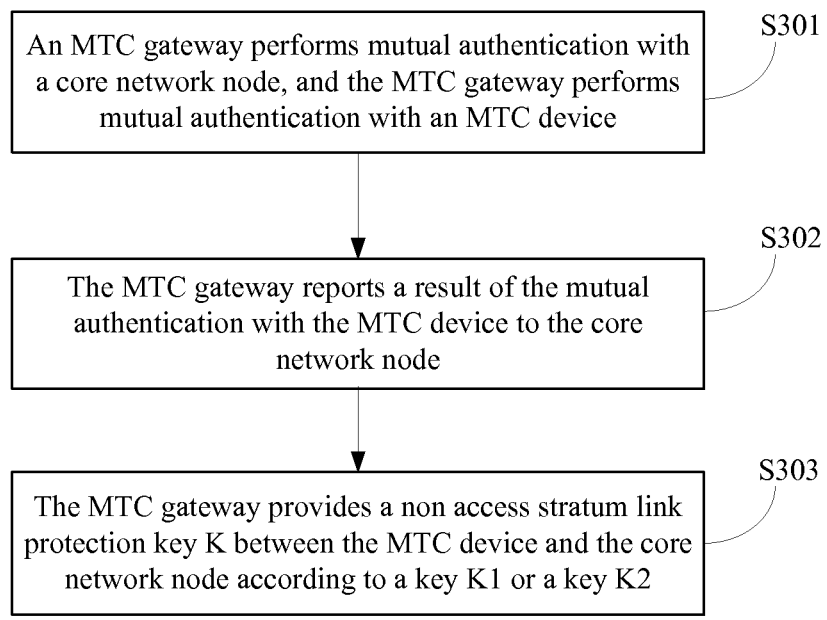
FIG. 3 is a basic schematic flowchart of an MTC device authentication method according to a first embodiment of the present invention.

FIG. 3 is a basic schematic flowchart of an MTC device authentication method according to a first embodiment of the present invention. Details are described as follows:

S301: An MTC gateway performs mutual authentication with a core network node and the MTC gateway performs mutual authentication with an MTC device.

In this embodiment of the present invention, the mutual authentication between the MTC gateway and the core network node and the mutual authentication between the MTC gateway and the MTC device may be performed at the same time, and may also be performed at different time. When they are performed at different time, the present invention does not limit time order.

S302: The MTC gateway reports a result of the mutual authentication with the MTC device to the core network node.

S303: The MTC gateway provides a non access stratum link protection key K between the MTC device and the core network node according to a key K1 or a key K2.

In this embodiment, the key K1 is generated in a process of the mutual authentication performed between the MTC gateway and the core network node, and may be a Kasme key. The key K2 may be a NAS key derived by the MTC gateway according to a key algorithm A1 and the key K1, where the key algorithm A1, such as a NAS algorithm, is selected by the MTC gateway, and it includes a NAS integrity protection key and a ciphering key. Because the key K1 is generated in the process of the mutual authentication performed between the MTC gateway and the core network node, it is understandable that the core network node may also derive the foregoing key K2 according to the key K1.

As an embodiment of the present invention, the MTC gateway may deliver the key K2 to all MTC devices connected to it.

Because each MTC device in an MTC device group stores the key K2 delivered by the MTC gateway, and the core network node also derives the key K2, the MTC device or the core network node may use the key K2 to protect data transferred on a NAS link between the MTC device and the core network node. That is, in this embodiment, the MTC device may directly use the key K2 as the non access stratum link protection key K between it and the core network node.

Figure 4:
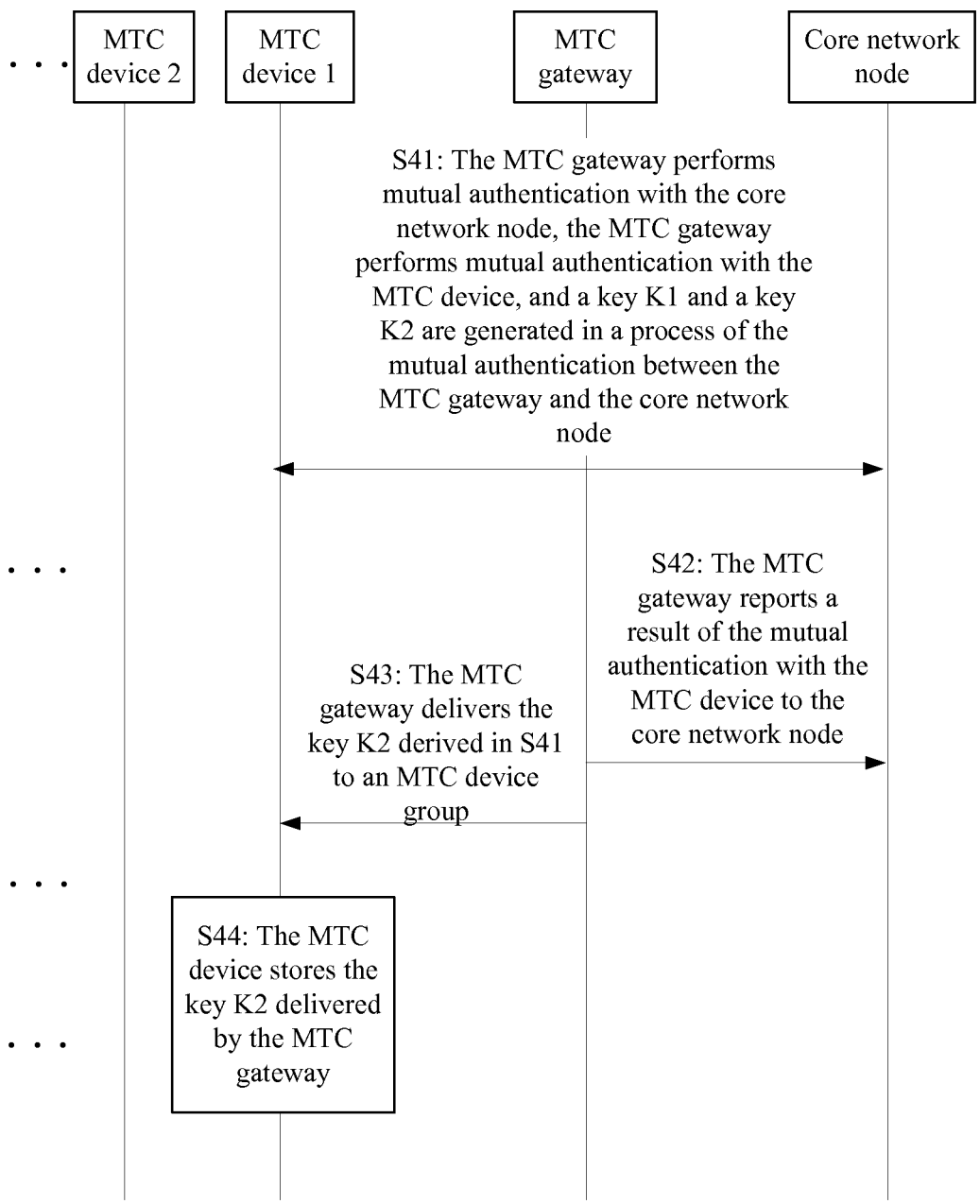
FIG. 4 is a schematic flowchart of interaction among an MTC gateway, an MTC device, and a core network node according to a first embodiment of the present invention.

FIG. 4 shows a procedure of interaction among an MTC gateway, an MTC device, and a core network node when the MTC gateway delivers a key K2 as a non access stratum link protection key K between the MTC device and the core network node to the MTC device where the procedure is briefly described as follows:

S41: The MTC gateway performs mutual authentication with the core network node, the MTC gateway performs mutual authentication with the MTC device, and a key K1 and the key K2 are generated in a process of the mutual authentication between the MTC gateway and the core network node.

S42: The MTC gateway reports a result of the mutual authentication with the MTC device to the core network node.

S43: The MTC gateway delivers the key K2 derived in S41 to an MTC device group.

S44: The MTC device stores the key K2 delivered by the MTC gateway.

As another embodiment of the present invention, the MTC gateway may also provide the non access stratum link protection key K between the MTC device and the core network node by using the following method:

The MTC gateway derives a non access stratum key K3 according to a key algorithm A2 and the key K1, or according to a key algorithm A2 and the key K2.

The MTC gateway delivers the non access stratum key K3 as the non access stratum link protection key K between the MTC device and the core network node to the MTC device.

The key algorithm A2 is a key algorithm selected by the core network node for the MTC device after the core network node receives an authentication result of the mutual authentication between the MTC gateway and the MTC device.

Figure 5A:
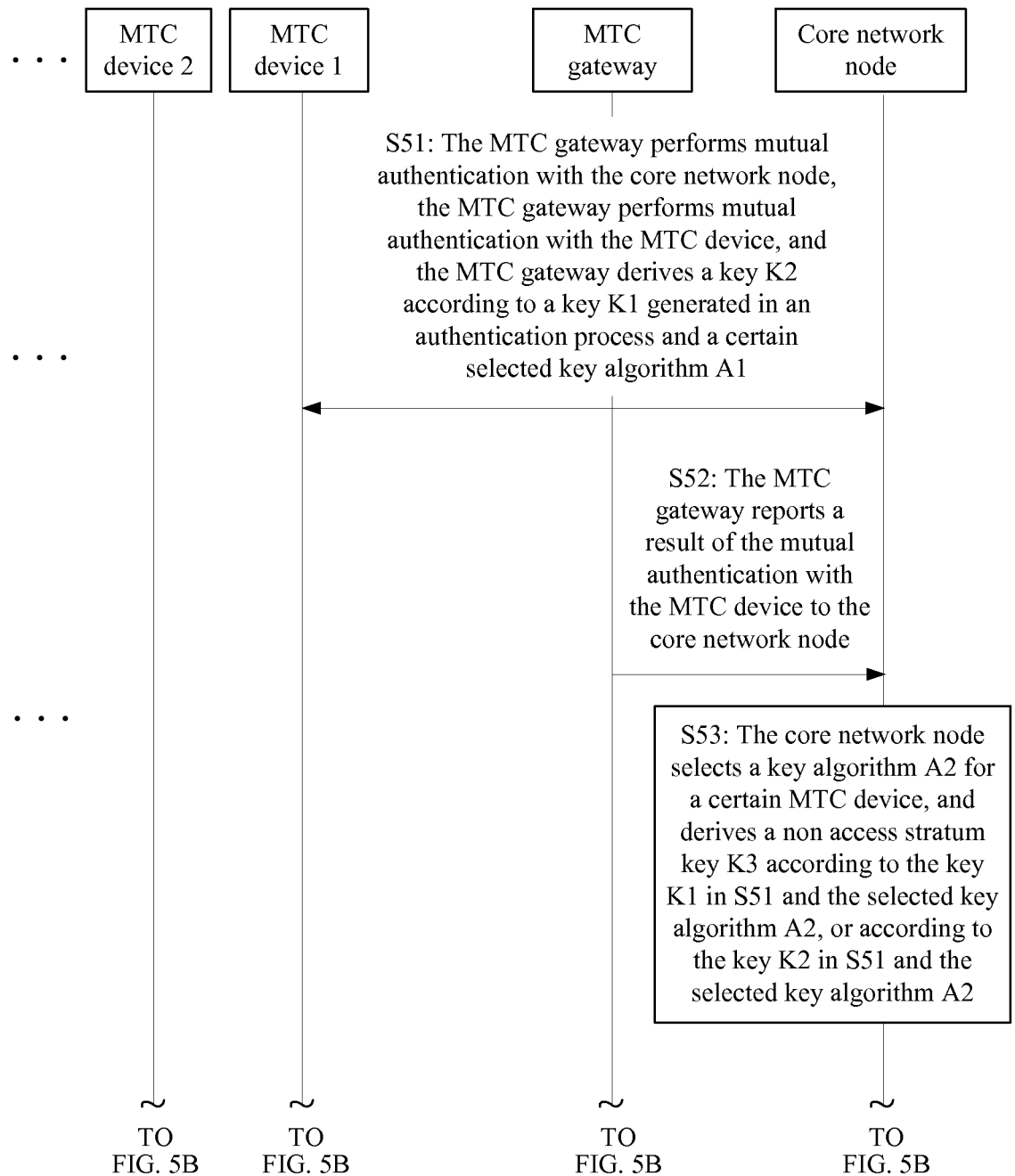
FIG. 5A and FIG. 5B are a schematic flowchart of interaction among an MTC gateway, an MTC device, and a core network node according to a second embodiment of the present invention.
Figure 5B:
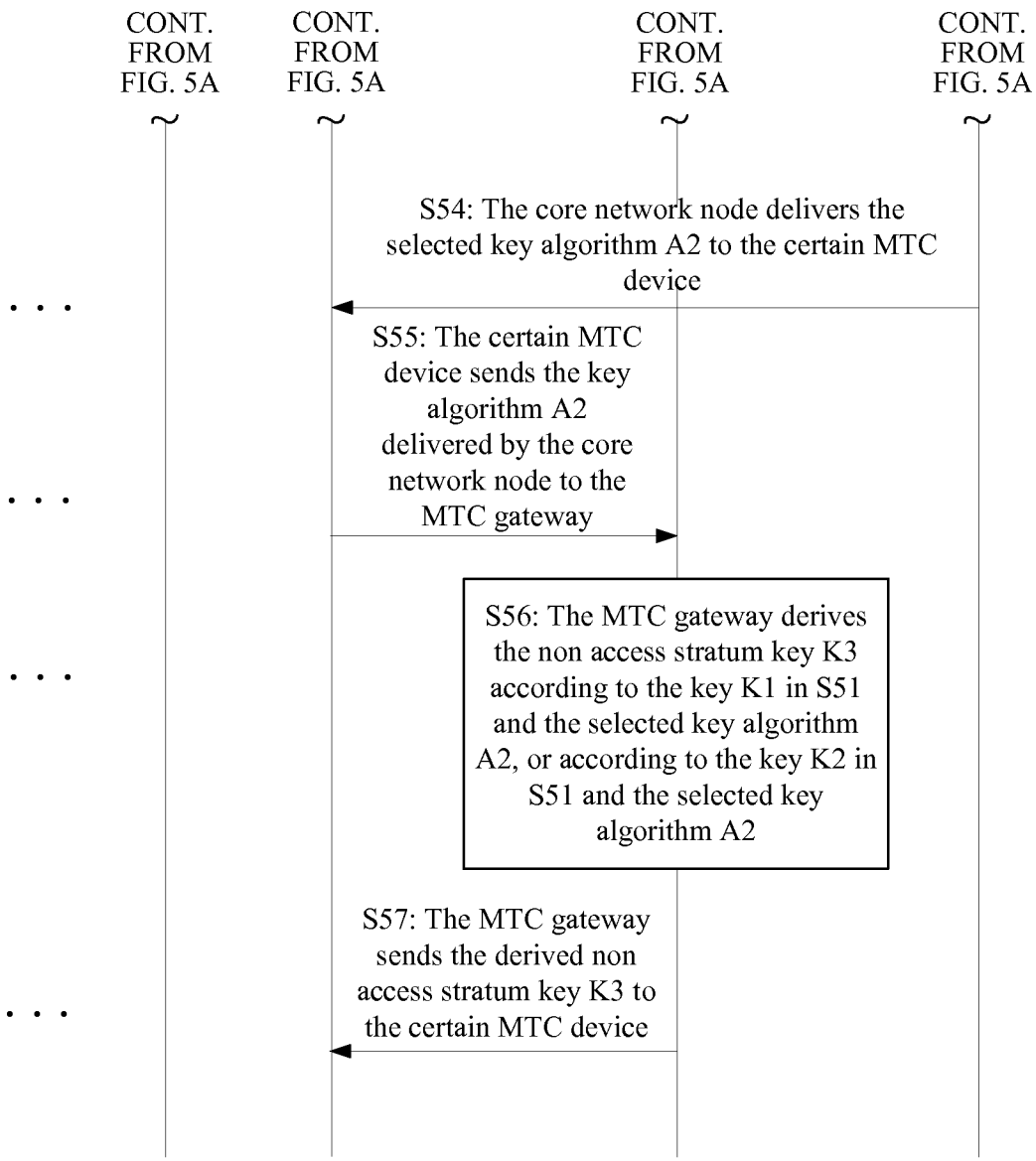

To clearly explain the embodiment in which the MTC gateway provides the non access stratum link protection key K between the MTC device and the core network node, FIG. 5A and FIG. 5B show a procedure of interaction among an MTC gateway, an MTC device, and a core network node, where the procedure is briefly described as follows:

S51: The MTC gateway performs mutual authentication with the core network node, the MTC gateway performs mutual authentication with the MTC device, and the MTC gateway derives a key K2 according to a key K1 generated in an authentication process and a certain selected key algorithm A1.

S52: The MTC gateway reports a result of the mutual authentication with the MTC device to the core network node.

S53: After receiving an authentication result which is of mutual authentication with a certain MTC device and reported by the MTC gateway, the core network node selects a key algorithm A2 for the certain MTC device, and derives a non access stratum key K3 according to the key K1 in S51 and the selected key algorithm A2, or according to the key K2 in S51 and the selected key algorithm A2.

S54: The core network node delivers the selected key algorithm A2 to the certain MTC device.

S55: The certain MTC device sends, to the MTC gateway, the key algorithm A2 which is delivered by the core network node.

S56: The MTC gateway derives the non access stratum key K3 according to the key K1 in S51 and the selected key algorithm A2, or according to the key K2 in S51 and the selected key algorithm A2.

It should be noted that, an alternative manner for S54 to S56 is: The core network node delivers the selected key algorithm A2 directly to the MTC gateway, and the MTC gateway derives the non access stratum key K3 according to the key K1 in S51 and the selected key algorithm A2, or according to the key K2 in S51 and the selected key algorithm A2.

S57: The MTC gateway sends the derived non access stratum key K3 to a certain MTC device.

Apparently, because in S53, the core network node also derives the non access stratum key K3, and in S57, the MTC gateway also sends the derived non access stratum key K3 to the certain MTC device, the certain MTC device may use the non access stratum key K3 as the non access stratum link protection key K between the MTC device and the core network node to protect data on a link.

Figure 6A:
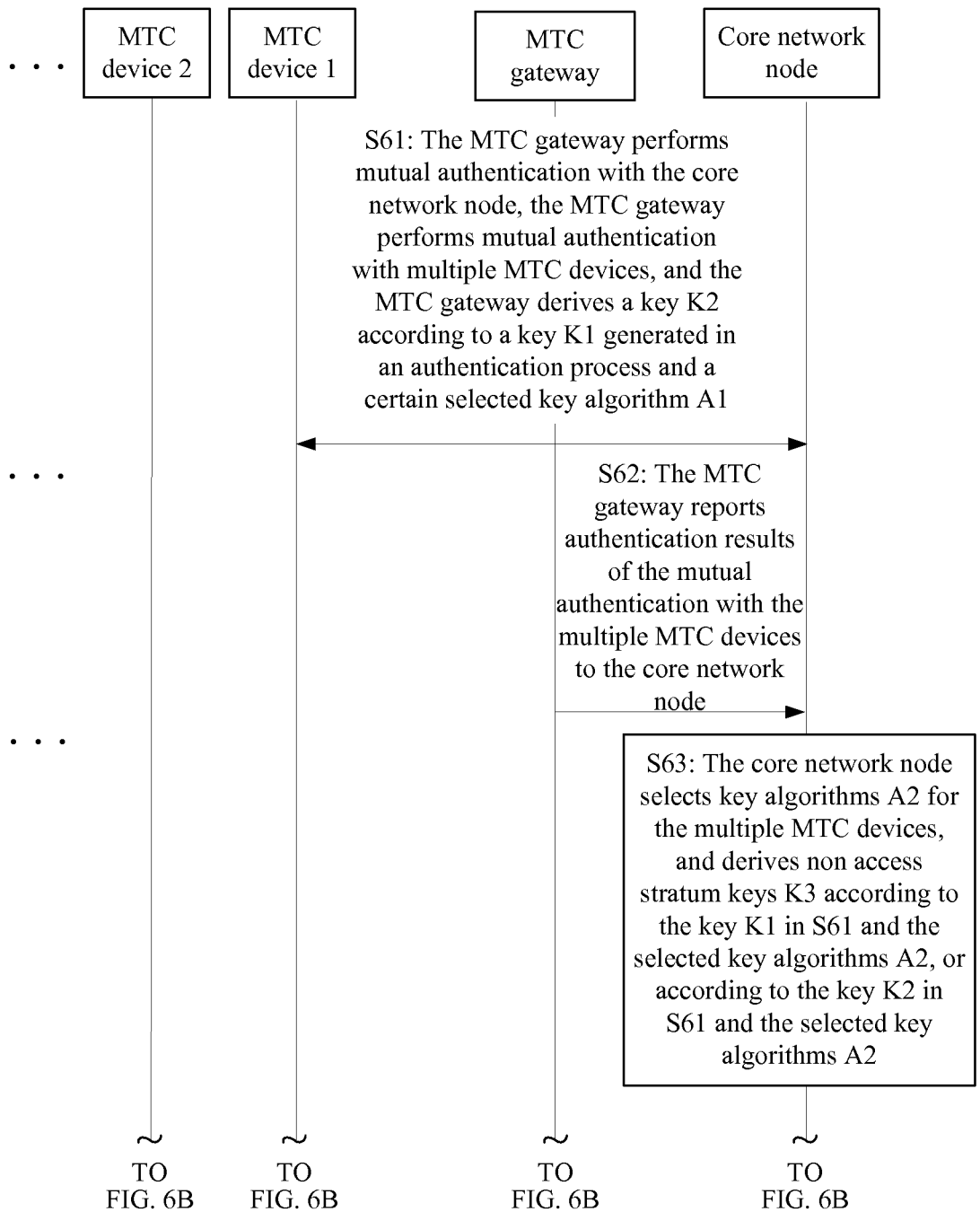
FIG. 6A and FIG. 6B are a schematic flowchart of interaction among an MTC gateway, an MTC device, and a core network node according to a third embodiment of the present invention.
Figure 6B:
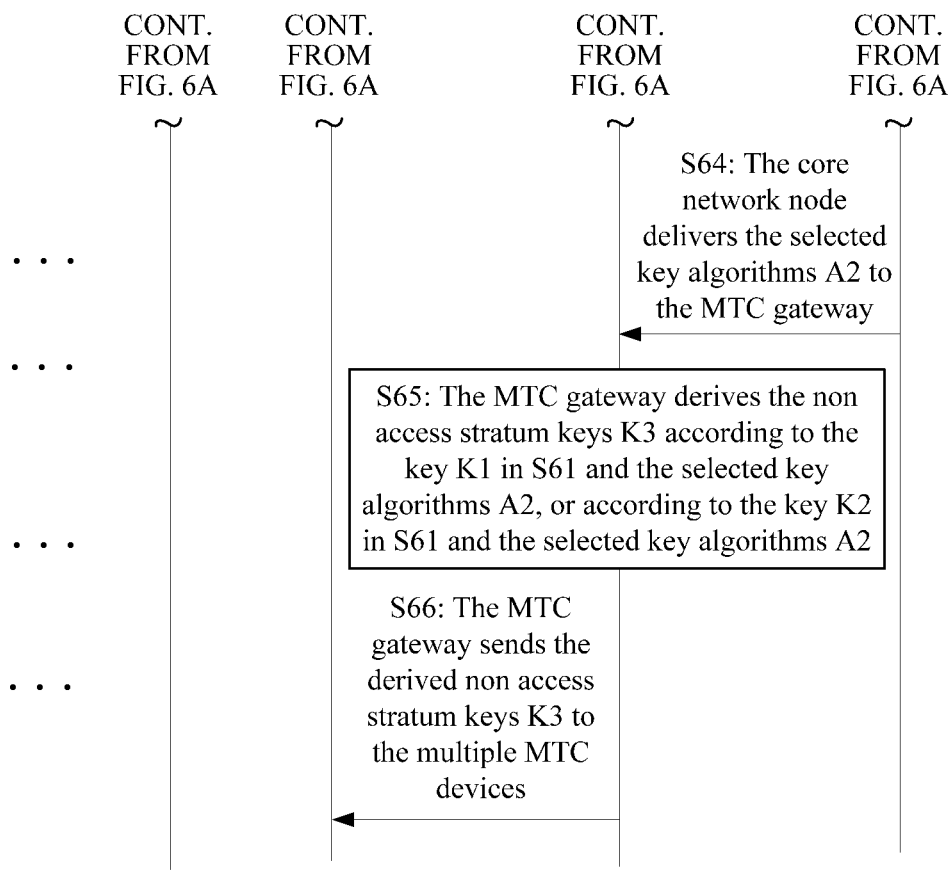

FIG. 6A and FIG. 6B show another procedure of interaction among an MTC gateway, an MTC device, and a core network node according to the embodiment in which the MTC gateway provides the non access stratum link protection key K between the MTC device and the core network node, where the procedure includes:

S61: The MTC gateway performs mutual authentication with the core network node, the MTC gateway performs mutual authentication with multiple MTC devices, and the MTC gateway derives a key K2 according to a key K1 generated in an authentication process and a certain selected key algorithm A1.

The mutual authentication performed between the MTC gateway and the multiple MTC devices may be performed at the same time, and may also be performed at different time, which is not limited in the embodiment.

S62: The MTC gateway reports authentication results of the mutual authentication with the multiple MTC devices to the core network node.

S63: After receiving the authentication results which are of the mutual authentication with the multiple MTC devices and reported by the MTC gateway, the core network node selects key algorithms A2 for the multiple MTC devices, and derives non access stratum keys K3 according to the key K1 in S61 and the selected key algorithms A2, or according to the key K2 in S61 and the selected key algorithms A2.

S64: The core network node delivers the selected key algorithms A2 to the MTC gateway.

S65: The MTC gateway derives the non access stratum keys K3 according to the key K1 in S61 and the selected key algorithms A2, or according to the key K2 in S61 and the selected key algorithms A2.

Also, it should be noted that, an alternative manner for S64 to S65 is: The core network node delivers the selected key algorithms A2 to the multiple MTC devices, the MTC devices send the key algorithms A2 to the MTC gateway, and the MTC gateway derives the non access stratum keys K3 according to the key K1 in S61 and the selected key algorithms A2, or according to the key K2 in S61 and the selected key algorithms A2.

In this embodiment, the key algorithms A2 selected by the core network node for the multiple MTC devices may be one same key algorithm, and may also be different key algorithms which are selected according to different MTC devices and delivered to the MTC devices or the MTC gateway in a batch.

S66: The MTC gateway sends the derived non access stratum keys K3 to the multiple MTC devices.

One difference between the embodiment shown in FIG. 5A and FIG. 5B and the embodiment shown in FIG. 6A and FIG. 6B is that: In the embodiment shown in FIG. 5A and FIG. 5B, because the core network node selects a key algorithm A2 according to each MTC device, key algorithms are delivered one by one to the MTC gateway (or MTC devices), and the MTC gateway then derives a non access stratum key K3 for each MTC device, while in the embodiment shown in FIG. 6A and FIG. 6B, when the core network node selects key algorithms A2 for multiple MTC devices, the core network node may deliver the key algorithms A2 in a batch to the MTC devices or the MTC gateway, and then the MTC gateway derives non access stratum keys K3 for the multiple MTC devices.

It is not difficult to understand that, when a new MTC device is connected to the MTC gateway, that is, when an MTC device group is updated, the non access stratum keys K3 may be derived and updated according to the procedure in the embodiment shown in FIG. 5A and FIG. 5B. Certainly, if a policy configured on the MTC gateway and the core network node is that authentication between the MTC gateway and the core network node is triggered when the MTC device group is updated, a new authentication procedure is performed between the MTC gateway and the core network node to update the key K1 or the key K2.

Protection of an access stratum link protection key between an MTC device and an RAN node such as a base station (NodeB) or an evolved NodeB (eNodeB) may be implemented by segment: Link protection between the MTC device and an MTC gateway is pre-segment link protection, and link protection between the MTC gateway and the RAN node is post-segment link protection. For the pre-segment link protection, because it is protection of a short-distance transmission link (such as Bluetooth and Zigbee), it is not within a consideration scope of 3GPP. For the post-segment link protection, a key KeNB may be generated on the MTC gateway and the RAN node, and then an air interface protection key between the MTC gateway and the RAN node is derived from the key KeNB. As an embodiment of the present invention, the MTC gateway may provide an access stratum link protection key between the MTC gateway and the RAN node according to the key K1, which includes the following steps:

S061: The MTC gateway obtains a count value Ncount1 which is of a message counter and provided by an MTC device.

The count value Ncount1 of the message counter is a value obtained by counting messages exchanged in a process of interaction between the MTC device and the core network node, and is reported by the MTC device actively to the MTC gateway or reported to the MTC gateway according to a request of the MTC gateway.

S062: The MTC gateway derives a key KeNB according to the count value Ncount1 of the message counter and the key K1.

S063: The MTC gateway derives an access stratum link protection key between the MTC gateway and the RAN node according to the key KeNB.

To ensure that KeNBs derived at different time points are different, that is, to keep updating of the KeNB, in addition to the key K1 or the count value Ncount1 of the message counter, another key derivation parameter, such as an MTC device identity, may be included to derive the KeNB. Therefore, as another embodiment of the present invention, the MTC gateway provides an access stratum link protection key between the MTC gateway and the RAN node according to the key K1, which includes the following steps:

S'061: The MTC gateway obtains a count value Ncount1 which is of a message counter and provided by an MTC device.

In this embodiment, the count value Ncount1 of the message counter has the same meaning as the count value Ncount1 of the message counter in the previous embodiment.

S'062: The MTC gateway obtains a device identity of the MTC device.

S'063: The MTC gateway derives a key KeNB according to the count value Ncount1 of the message counter, the key K1, and the device identity of the MTC device.

S'064: The MTC gateway derives an access stratum link protection key between the MTC gateway and the RAN node according to the key KeNB.

Because the MTC gateway can provide a value obtained by counting messages exchanged in a process of interaction with the core network node, the following steps are another embodiment in which the MTC gateway provides an access stratum link protection key between the MTC gateway and the RAN node according to the key K1, and include:

The MTC gateway derives a key KeNB according to a count value Ncount2 of a message counter and the key K1;

The count value Ncount2 of the message counter is a value obtained by counting messages exchanged in a process of interaction between the MTC gateway and the core network node.

The MTC gateway derives an access stratum link protection key between the MTC gateway and the RAN node according to the key KeNB.

Figure 7:
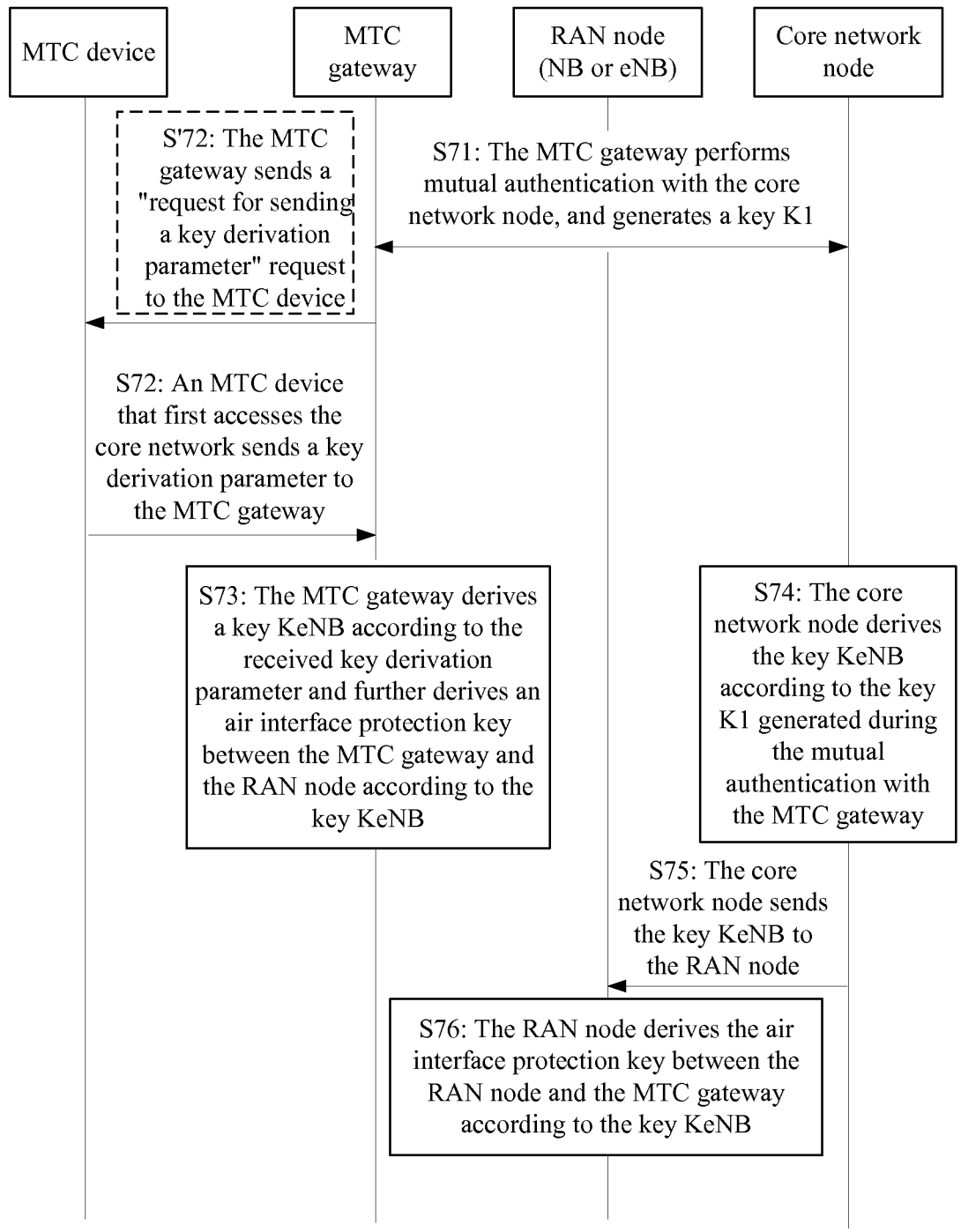
FIG. 7 is a schematic flowchart of interaction among an MTC device, an MTC gateway, an RAN node (a base station (NB) or an evolved NodeB (eNB)), and a core network node according to an embodiment of the present invention.

To better explain the embodiment in which the MTC gateway provides the access stratum link protection key between the MTC gateway and the RAN node according to the key K1, FIG. 7 shows a procedure of interaction among an MTC device, an MTC gateway, an RAN node (a base station (NB) or an evolved NodeB (eNB)), and a core network node, where the procedure is briefly described as follows:

S71: The MTC gateway performs mutual authentication with the core network node, and generates a key K1, and the MTC gateway performs mutual authentication with the MTC device.

S72: An MTC device that first accesses the core network sends a key derivation parameter to the MTC gateway.

In an MTC device group, the MTC device that first accesses the core network through the MTC gateway helps the MTC gateway establish AS security. The MTC device that helps the MTC gateway establish the AS security is capable of providing the key derivation parameter required for deriving a root key KeNB and an air interface protection key, such as a count value of a message counter (for example, Ncount1). In this embodiment, the MTC gateway may also send a request to the MTC device, and the MTC device sends the key derivation parameter to the MTC gateway after receiving the request, which is as shown in procedure S'72 in the dashed block in FIG. 7.

S73: The MTC gateway derives the key KeNB according to the received key derivation parameter and further derives the air interface protection key between the MTC gateway and the RAN node according to the key KeNB.

S74: The core network node derives the key KeNB according to the key K1 generated during mutual authentication with the MTC gateway.

When multiple MTC devices are connected to the MTC gateway, the multiple MTC devices share the AS of the MTC gateway, therefore, after the MTC device that first accesses the core network through the MTC gateway and helps the MTC gateway establish the AS security, the core network node and the MTC gateway no longer derive a key KeNB for another MTC device that accesses the network, or ignore a KeNB derived afterwards.

S75: The core network node sends the key KeNB to the RAN node.

S76: The RAN node derives an air interface protection key between the RAN node and the MTC gateway according to the key KeNB.

It may be known from the foregoing embodiment that, when an MTC device accesses the core network through the MTC gateway, the MTC device may only implement a higher protocol layer such as a GMM/SM layer or a NAS between it and the core network node on a network side, and a lower protocol layer (for example, an AS) between the MTC device and the RAN node on the network side are implemented on the MTC gateway. Therefore, from the perspectives of both software and hardware, the cost of the MTC device itself is reduced.

Figure 8:
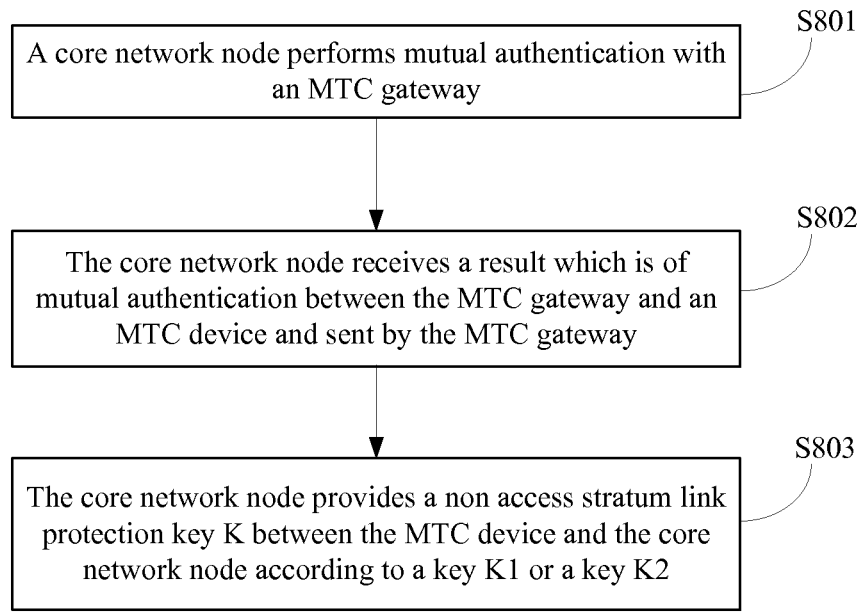
FIG. 8 is a basic schematic flowchart of an MTC device authentication method according to the second embodiment of the present invention.

FIG. 8 is a basic schematic flowchart of an MTC device authentication method according to a second embodiment of the present invention, where the method mainly includes the following steps:

S801: A core network node performs mutual authentication with an MTC gateway.

S802: The core network node receives a result which is of mutual authentication between the MTC gateway and an MTC device and sent by the MTC gateway.

S803: The core network node provides a non access stratum link protection key K between the MTC device and the core network node according to a key K1 or a key K2.

In this embodiment, the key K1 or the key K2 is the same as that in the foregoing embodiment; the performing, by the core network node, the mutual authentication with the MTC gateway and the receiving, by the core network node, the result which is of the mutual authentication between the MTC gateway and the MTC device and sent by the MTC gateway are described in detail in the foregoing embodiment, and are not repeatedly described here. The providing, by the core network node, the non access stratum link protection key K between the MTC device and the core network node according to the key K1 or the key K2 may be implemented in the following manner:

S081: The core network node derives the non access stratum link protection key K between the MTC device and the core network node according to a key algorithm A2 and the key K1, or according to a key algorithm A2 and the key K2.

It should be noted that, in this embodiment, when the core network node derives the non access stratum link protection key K between the MTC device and the core network node according to the key algorithm A2 and the key K1, or according to the key algorithm A2 and the key K2, different key algorithms A2 may be selected for different MTC devices, so as to derive different non access stratum link protection keys K for different MTC devices, which are as described in the procedures S53 and S54 shown in FIG. 5A and FIG. 5B or the procedures S63 and S64 shown in FIG. 6A and FIG. 6B.

S082: The core network node delivers the key algorithm A2 to the MTC gateway or the MTC device.

Afterwards, the MTC gateway or the MTC device may generate the non access stratum link protection key K between the MTC device and the core network node according to the key algorithm A2. In this embodiment, interaction between the core network node, the MTC gateway, and the MTC device is as shown in FIG. 5A and FIG. 5B or FIG. 6A and FIG. 6B. Reference may be made to FIG. 5A and FIG. 5B or FIG. 6A and FIG. 6B and the text description, and details are not repeatedly described here.

Figure 9:
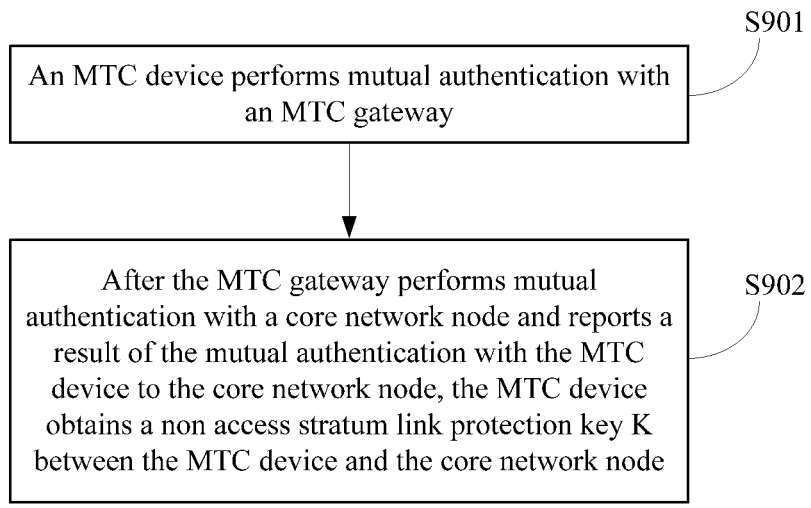
FIG. 9 is a basic schematic flowchart of an MTC device authentication method according to the third embodiment of the present invention.

FIG. 9 is a basic schematic flowchart of an MTC device authentication method according to a third embodiment of the present invention, where the method mainly includes the following steps:

S901: An MTC device performs mutual authentication with an MTC gateway.

S902: The MTC gateway performs mutual authentication with a core network node and reports a result of the mutual authentication with the MTC device to the core network node, and the MTC device obtains a non access stratum link protection key K between the MTC device and the core network node.

The performing, by the MTC device, the mutual authentication with the MTC gateway and the reporting, by the MTC gateway, the result of the mutual authentication with the MTC device to the core network node are described in detail in the foregoing embodiments and not repeatedly described here.

In this embodiment, the obtaining, by the MTC device, the non access stratum link protection key K between the MTC device and the core network node may be: The MTC device receives a key K2 delivered by the MTC gateway; the MTC device uses the key K2 directly as the non access stratum link protection key K between the MTC device and the core network node; for example, in procedures S41 to S43 shown in FIG. 4, the MTC gateway derives the key K2 and delivers, in S44, the derived K2 to an MTC device group. Or, the MTC device directly receives a key K3 delivered by the MTC gateway; the MTC device uses the key K3 as the non access stratum link protection key K between the MTC device and the core network node; for example, in an alternative method in procedures S55 to S57 or procedures S65 to S67 shown in FIG. 5A and FIG. 5B or FIG. 6A and FIG. 6B, the core network node delivers a selected key algorithm A2 directly to the MTC gateway, and the MTC gateway derives the key K3 according to a key K1 in S51 or S61 and the selected key algorithm A2, or according to the key K2 in S51 or S61 and the selected key algorithm A2, and then the MTC gateway sends the derived non access stratum key K3 to one certain MTC device or multiple MTC devices, so that the MTC device uses the key K3 as the non access stratum link protection key K between the MTC device and the core network node.

In this embodiment, meanings of the key K2 and the non access stratum link protection key K are the same as those in the embodiment shown in FIG. 4, and a reason why the MTC device can use the key K2 directly as the non access stratum link protection key K between the MTC device and the core network node is also described in the embodiment shown in FIG. 4.

Two other manners for obtaining, by the MTC device, the non access stratum link protection key K between the MTC device and the core network node are separately given below.

Manner 1:

S911: The MTC device receives the key algorithm A2.

S912: The MTC device sends the key algorithm A2 to the MTC gateway.

S913: The MTC device receives the key K3 delivered by the MTC gateway and uses the key K3 as the non access stratum link protection key K between the MTC device and the core network node.

Reference may be made to FIG. 5A and FIG. 5B or FIG. 6A and FIG. 6B for examples of the foregoing S912 and S913. In procedure S55 or procedure S64 shown in FIG. 5A and FIG. 5B or FIG. 6A and FIG. 6B, after the key algorithm A2 delivered by the core network node is sent to the MTC gateway, the MTC gateway derives the non access stratum key K3 according to the key K1 in procedure S51 or procedure S61 shown in FIG. 5A and FIG. 5B or FIG. 6A and FIG. 6B and the selected key algorithm A2, or according to the key K2 in procedure S51 or procedure S61 shown in FIG. 5A and FIG. 5B or FIG. 6A and FIG. 6B and the selected key algorithm A2; after the key K3 derived by the MTC gateway is received by a certain MTC device or multiple MTC devices, the MTC device may use the key K3 as the non access stratum link protection key K between the MTC device and the core network node.

Manner 2:

S921: The MTC device receives the key K1 delivered by the MTC gateway or the key K2 delivered by the MTC gateway.

S922: The MTC device receives the key algorithm A2.

S923: The MTC device generates the non access stratum link protection key K between the MTC device and the core network node according to the key algorithm A2 and the key K1, or according to the key algorithm A2 and the key K2.

In the foregoing implementation manners, the key algorithm A2 and key K1 or key K2 are the same as those in the foregoing embodiments and are not further described.

Figure 10:
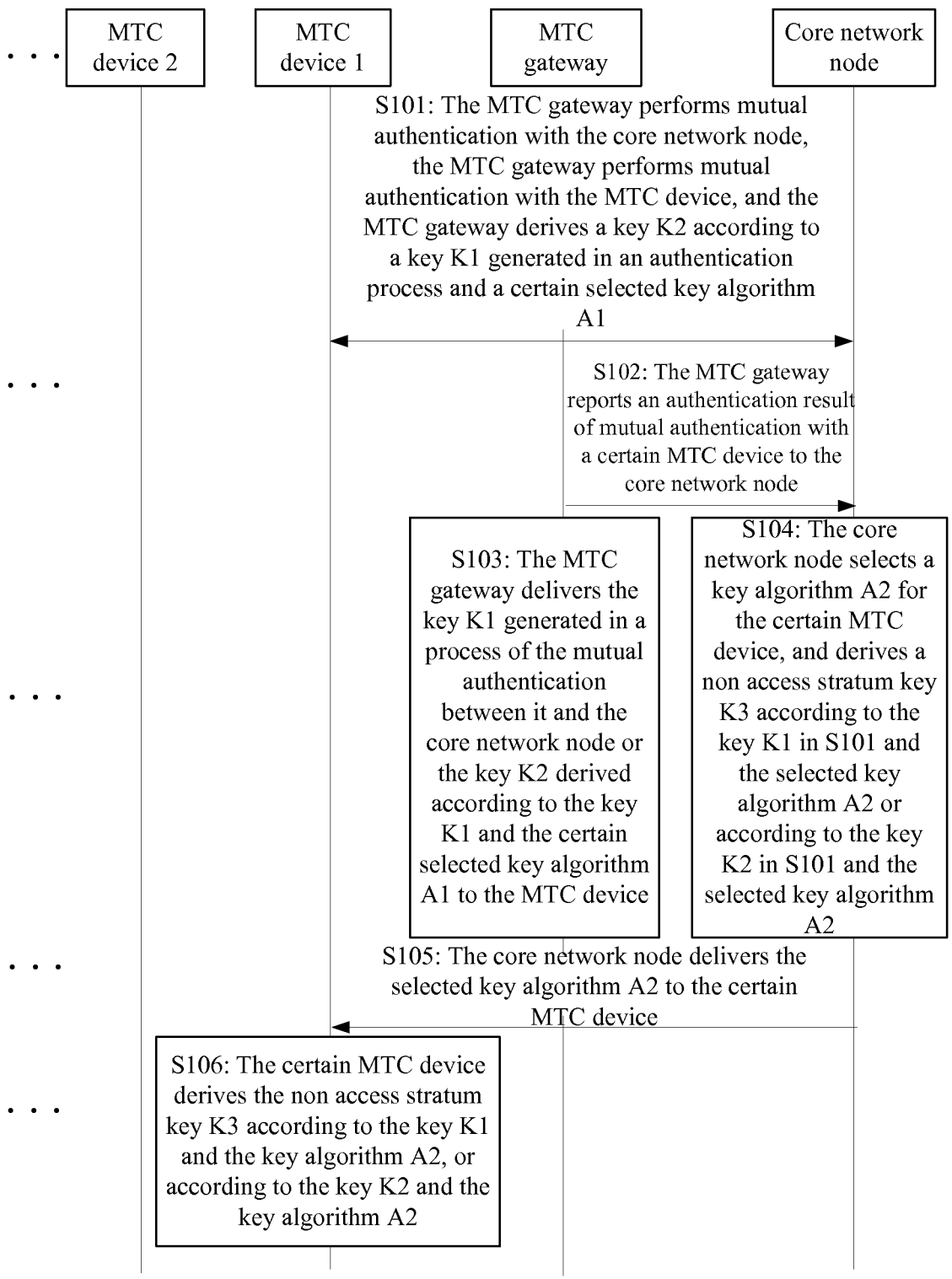
FIG. 10 is a schematic flowchart of interaction among an MTC gateway, an MTC device, and a core network node according to a fourth embodiment of the present invention.

In order to clearly explain the embodiment in the foregoing manner 2, FIG. 10 shows a procedure of interaction among an MTC gateway, an MTC device, and a core network node, where the procedure is briefly described as follows:

S101: The MTC gateway performs mutual authentication with the core network node, the MTC gateway performs mutual authentication with the MTC device, and the MTC gateway derives a key K2 according to a key K1 generated in an authentication process and a certain selected key algorithm A1.

S102: The MTC gateway reports a result of mutual authentication with a certain MTC device to the core network node.

S103: The MTC gateway delivers the key K1 generated in a process of the mutual authentication between it and the core network node or the key K2 derived according to the key K1 and the certain selected key algorithm A1 to the MTC device.

S104: The core network node selects a key algorithm A2 for the certain MTC device, and derives a non access stratum key K3 according to the key K1 in S101 and the selected key algorithm A2 or according to the key K2 in S101 and the selected key algorithm A2.

S105: The core network node delivers the selected key algorithm A2 to the certain MTC device.

S106: The certain MTC device derives the non access stratum key K3 according to the key K1 and the key algorithm A2, or according to the key K2 and the key algorithm A2.

K3 is the non access stratum link protection key K between the MTC device and the core network node.

In this embodiment of the present invention, because the key K1 is derived during the mutual authentication between the MTC gateway and the core network node, it is necessary to describe a trigger condition of the mutual authentication between the MTC gateway and the core network node. In this embodiment of the present invention, the trigger condition of the mutual authentication between the MTC gateway and the core network node may be: When an MTC device group is updated, or when a certain timer expires, or when a NAS message counter of a certain MTC device in an MTC device group reaches a maximum count value, the MTC gateway performs mutual authentication with the core network node.

To avoid frequently updating the key K1 between the MTC device and the core network node, which is caused by frequently triggering the mutual authentication between the MTC gateway and the core network node, a lifetime (Lifetime) of the key K1 may also be set, so that when the lifetime is over, the MTC gateway performs mutual authentication with the core network node to start to generate the key K1.

It should be noted that, to reduce signaling traffic caused by authentication, it should be ensured that the core network node only triggers authentication on the MTC gateway and prohibits triggering authentication on an MTC device that is directly connected to the MTC gateway. In this embodiment of the present invention, the foregoing purpose may be achieved by using the following manners.

Manner 1: The core network node differentiates the MTC gateway from the MTC device by identifying a device identity or a device identity bit, so as to ensure that authentication is triggered only on the MTC gateway and is not triggered on the MTC device directly connected to the MTC gateway. For example, a device identity bit may be added in a user device context (Context) field of the core network node, so that different device identity bits (for example, a bit "0" or a bit "1") are used to differentiate the MTC gateway from the MTC device, or, different IMSI ranges are used as device identities for differentiating the MTC gateway from the MTC device.

Manner 2: Triggering authentication is prohibited when the MTC device initiates an initial layer 3 message; that is, an IE is added in the message, and the core network node determines that triggering authentication on the MTC device directly connected to the MTC gateway is prohibited.

Manner 3: The MTC gateway sends its key set identifier (Key Set Identifier, KSI) to each MTC device connected to it, the KSI is carried when the MTC device initiates an initial layer 3 message, and the core network node differentiates the MTC gateway from the MTC device according to the KSI.

It may be known from the foregoing embodiment of the present invention that, when an MTC device accesses the core network through the MTC gateway, the MTC device may only implement a higher protocol layer such as a GMM/SM layer or a NAS between it and the core network node on a network side, and does not need to implement a lower protocol layer such as an AS between it and an RAN node on the network side. Therefore, from the perspectives of both software and hardware, the cost of the MTC device is reduced.

Figure 11:
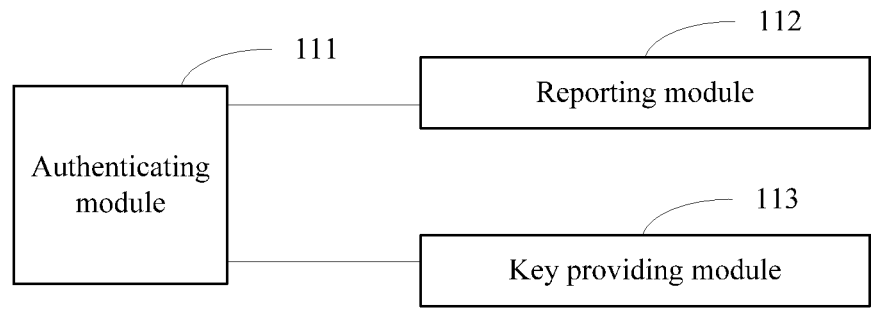
FIG. 11 is a schematic diagram of a basic logical structure of a gateway according to the first embodiment of the present invention.

FIG. 11 is a schematic diagram of a basic logical structure of a gateway according to the first embodiment of the present invention. For ease of description, only parts that are related to the embodiment of the present invention are shown, where a function module/unit may be a hardware module/unit, a software module/unit, or a hardware and software combined module/unit. The gateway includes an authenticating module 111, a reporting module 112, and a key providing module 113.

The authenticating module 111 is configured to perform mutual authentication with a core network node and perform mutual authentication with an MTC device.

The reporting module 112 is configured to report a result of the mutual authentication between the authenticating module 111 and the MTC device to the core network node.

The key providing module 113 is configured to provide a non access stratum link protection key K between the MTC device and the core network node according to a key K1 or a key K2, where the key K1 is a key generated in a process of the mutual authentication between the authenticating module 111 and the core network node, and the key K2 is a non access stratum key derived by the MTC gateway according to a key algorithm A1 and the key K1.

Figure 12:
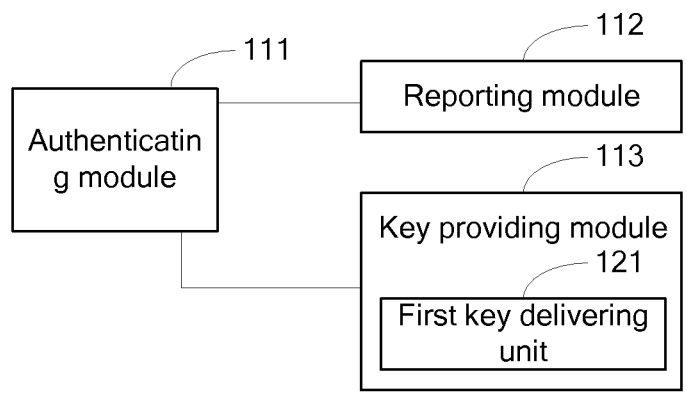
FIG. 12 is a schematic diagram of a basic logical structure of a gateway according to the second embodiment of the present invention.

The key providing module 113 may include a first key delivering unit 121, which is as shown in FIG. 12, and is configured to deliver the key K2 as the non access stratum link protection key K between the MTC device and the core network nod to the MTC device.

Figure 13:
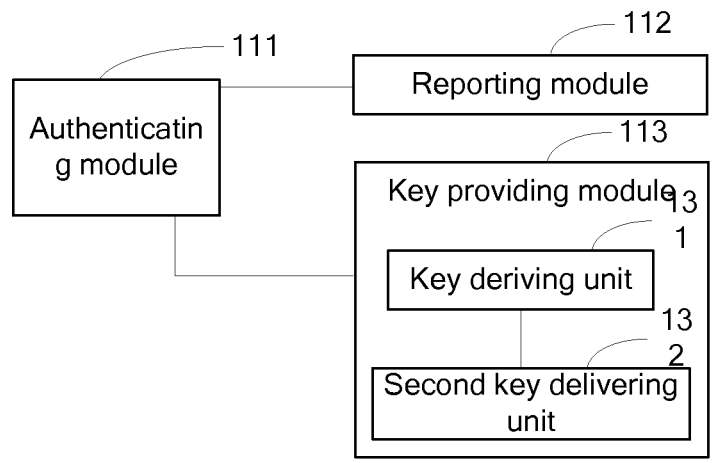
FIG. 13 is a schematic diagram of a basic logical structure of a gateway according to the third embodiment of the present invention.

The key providing module 113 may further include a key deriving unit 131 and a second key delivering unit 132, as shown in FIG. 13.

The key deriving unit 131 is configured to derive a non access stratum key K3 according to a key algorithm A2 and the key K1 which is generated in a process of the mutual authentication between the authenticating module 111 and the core network node, or according to a key algorithm A2 and the key K2.

The second key delivering unit 132 is configured to deliver to the MTC device.

Figure 14:
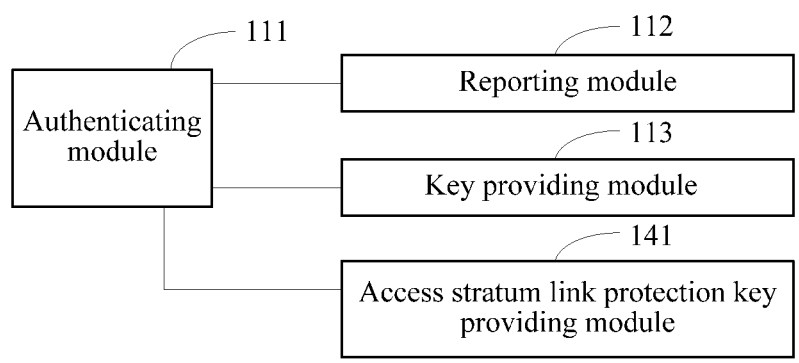
FIG. 14 is a schematic diagram of a basic logical structure of a gateway according to the fourth embodiment of the present invention.

The gateway in the embodiment shown in FIG. 11 to FIG. 13 may further include an access stratum link protection key providing module 141, as shown in FIG. 14. The access stratum link protection key providing module 141 is configured to provide an access stratum link protection key between the MTC gateway and a radio access network node according to the key K1 generated in the process of the mutual authentication between the authenticating module 111 and the core network node.

Figure 15:
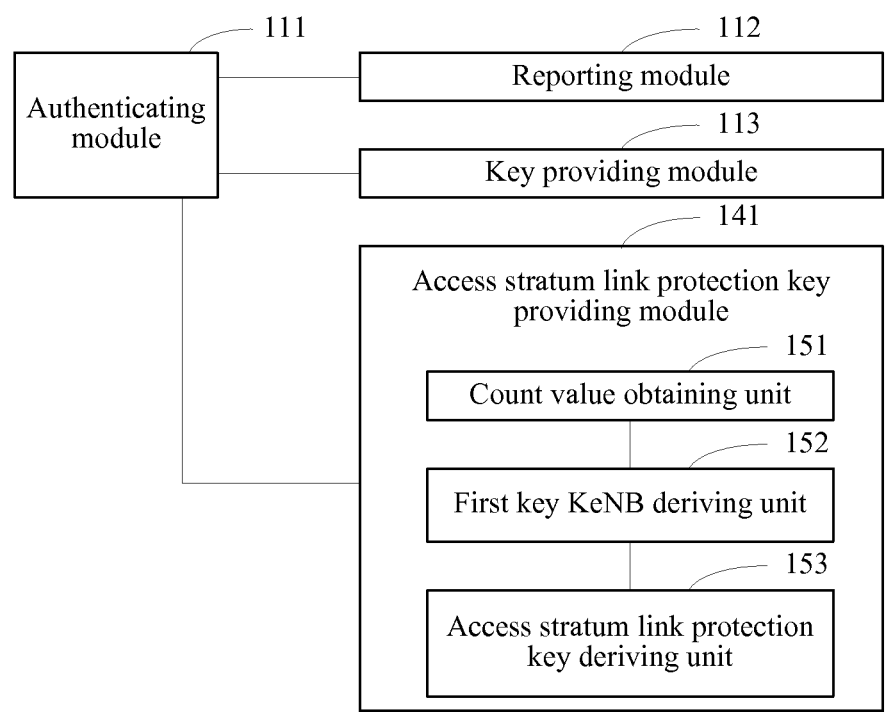
FIG. 15 is a schematic diagram of a basic logical structure of a gateway according to a fifth embodiment of the present invention.

The access stratum link protection key providing module 141 shown in FIG. 14 may include a count value obtaining unit 151, a first key KeNB deriving unit 152, and an access stratum link protection key deriving unit 153, as shown in FIG. 15.

The count value obtaining unit 151 is configured to obtain a count value Ncount1 which is of a message counter and provided by the MTC device, where the count value Ncount1 of the message counter is a value obtained by counting messages exchanged in the process of interaction between the MTC device and the core network node.

The first key KeNB deriving unit 152 is configured to derive a key KeNB according to the key K1 and the count value Ncount1 which is of the message counter and obtained by the count value obtaining unit 151.

The access stratum link protection key deriving unit 153 is configured to derive the access stratum link protection key between the MTC gateway and the radio access network node according to the key KeNB derived by the first key KeNB deriving unit 152.

Figure 16:
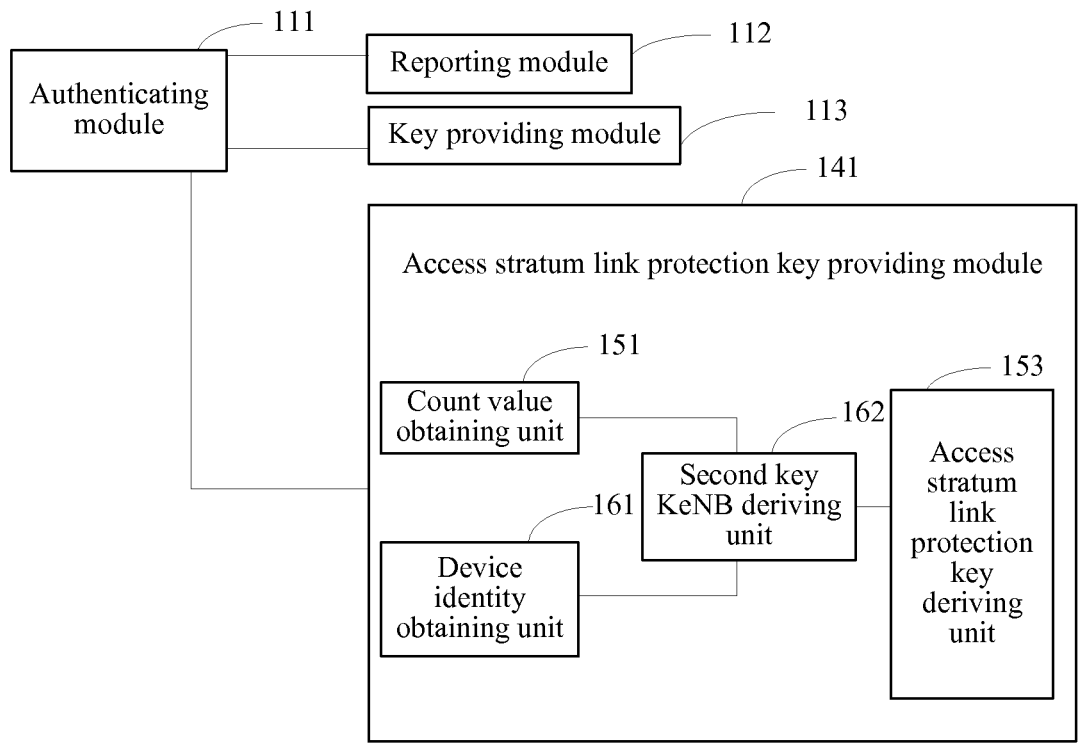
FIG. 16 is a schematic diagram of a basic logical structure of a gateway according to a sixth embodiment of the present invention.

The access stratum link protection key providing module 141 shown in FIG. 14 may include a count value obtaining unit 151, a device identity obtaining unit 161, a second key KeNB deriving unit 162, and an access stratum link protection key deriving unit 153, as shown in FIG. 16.

The count value obtaining unit 151 is configured to obtain a count value Ncount1 which is of a message counter and provided by the MTC device, where the count value Ncount1 of the message counter is a value obtained by counting messages exchanged in the process of interaction between the MTC device and the core network node.

The device identity obtaining unit 161 is configured to obtain a device identity of the MTC device.

The second key KeNB deriving unit 162 is configured to derive a key KeNB according to the count value Ncount1 of the message counter, the key K1, and the device identity.

The access stratum link protection key deriving unit 153 is configured to derive the access stratum link protection key between the MTC gateway and the radio access network node according to the key KeNB derived by the second key KeNB deriving unit 162.

Figure 17:
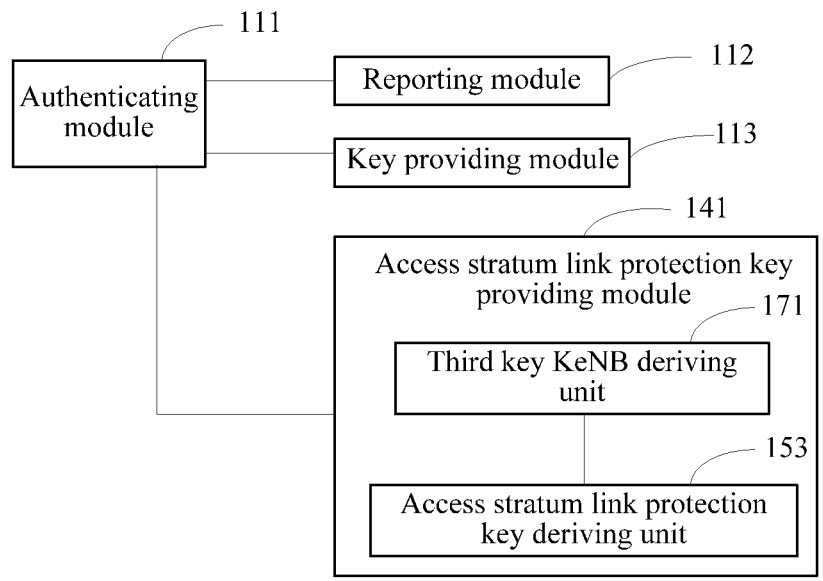
FIG. 17 is a schematic diagram of a basic logical structure of a gateway according to a seventh embodiment of the present invention.

The access stratum link protection key providing module 141 shown in FIG. 14 may include a third key KeNB deriving unit 171 and an access stratum link protection key deriving unit 153, as shown in FIG. 17, where the third key KeNB deriving unit 171 is configured to derive a key KeNB according to a count value Ncount2 of a message counter and the key K1, where the count value Ncount2 of the message counter is a value obtained by counting messages exchanged in an interaction process between the MTC gateway and the core network node.

Figure 18:
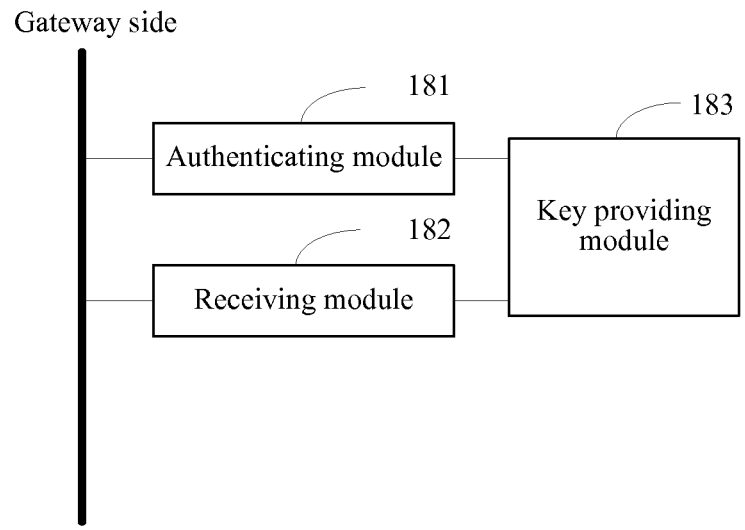
FIG. 18 is a schematic diagram of a basic logical structure of a core network node according to the first embodiment of the present invention.

FIG. 18 is a schematic diagram of a basic logical structure of a core network node according to the first embodiment of the present invention. For ease of description, only parts that are related to the embodiment of the present invention are shown, where a function module/unit may be a hardware module/unit, a software module/unit, or a hardware and software combined module/unit. The core network node includes an authenticating module 181, a receiving module 182, and a key providing module 183.

The authenticating module 181 is configured to perform mutual authentication with an MTC gateway.

The receiving module 182 is configured to receive a result of mutual authentication between the MTC gateway and an MTC device.

The key providing module 183 is configured to provide a non access stratum link protection key K between the MTC device and the core network node according to a key K1 or a key K2.

Figure 19:
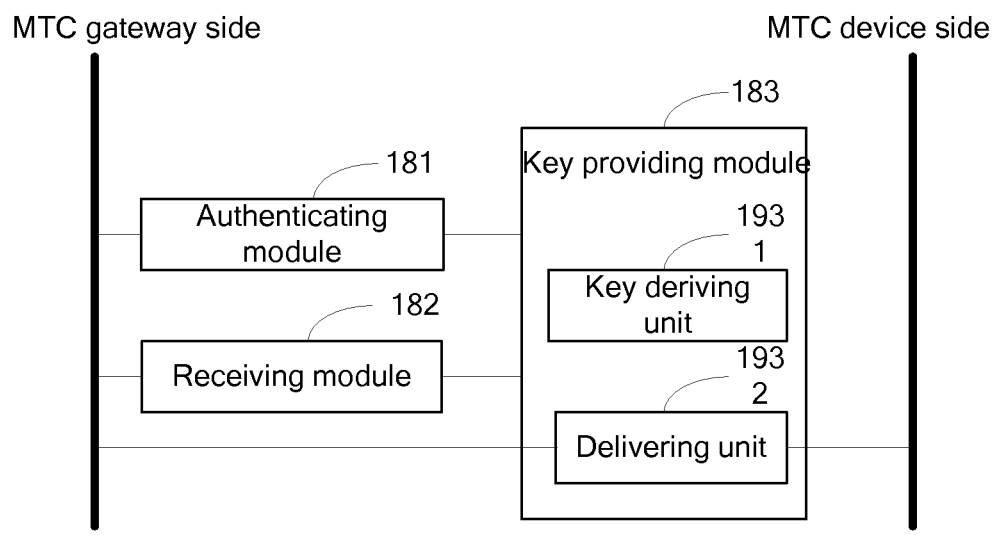
FIG. 19 is a schematic diagram of a basic logical structure of a core network node according to the second embodiment of the present invention.

The key providing module 183 may further include a key deriving unit 1931 and a delivering unit 1932, as shown in FIG. 19.

The key deriving unit 1931 is configured to derive the non access stratum link protection key K between the MTC device and the core network node according to a key algorithm A2 and the key K1, or according to a key algorithm A2 and the key K2.

The delivering unit 1932 is configured to deliver the key algorithm A2 to the MTC gateway or the MTC device, so that the MTC gateway or the MTC device generates the non access stratum link protection key K between the MTC device and the core network node according to the key algorithm A2.

In the embodiment shown in FIG. 18 and FIG. 19, the key algorithm A2 is a key algorithm selected by the core network node for the MTC device after the core network node receives an authentication result of the mutual authentication between the MTC gateway and the MTC device.

Figure 20:
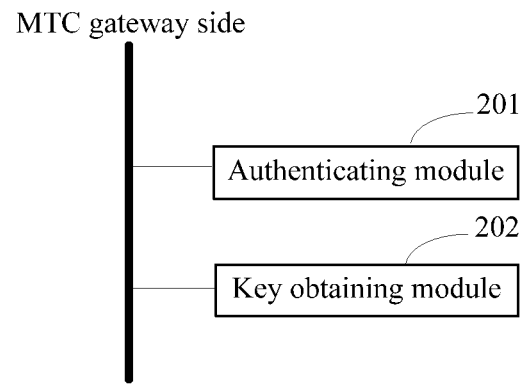
FIG. 20 is a schematic diagram of a basic logical structure of an MTC device according to the first embodiment of the present invention.

FIG. 20 is a schematic diagram of a basic logical structure of an MTC device according to the first embodiment of the present invention. For ease of description, only parts that are related to the embodiment of the present invention are shown, where a function module/unit may be a hardware module/unit, a software module/unit, or a hardware and software combined module/unit. The MTC device includes an authenticating module 201 and a key obtaining module 202.

The authenticating module 201 is configured to perform mutual authentication with an MTC gateway.

The key obtaining module 202 is configured to obtain a non access stratum link protection key K between the MTC device and a core network node after the MTC gateway performs mutual authentication with the core network node and reports a result of the mutual authentication with the authenticating module 201 to the core network node.

Figure 21:
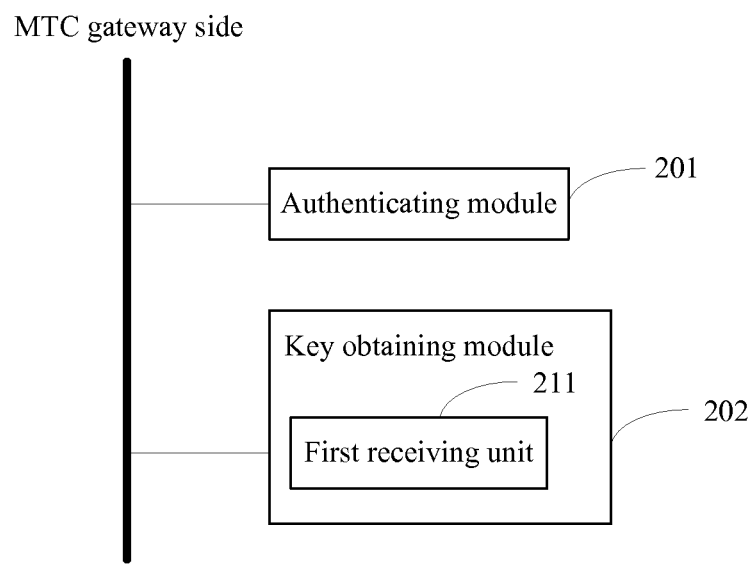
FIG. 21 is a schematic diagram of a basic logical structure of an MTC device according to the second embodiment of the present invention.

The key obtaining module 202 in the embodiment shown in FIG. 20 may include a first receiving unit 211, which is as shown in FIG. 21, and is configured to receive a key K2 delivered by the MTC gateway.

Figure 22:
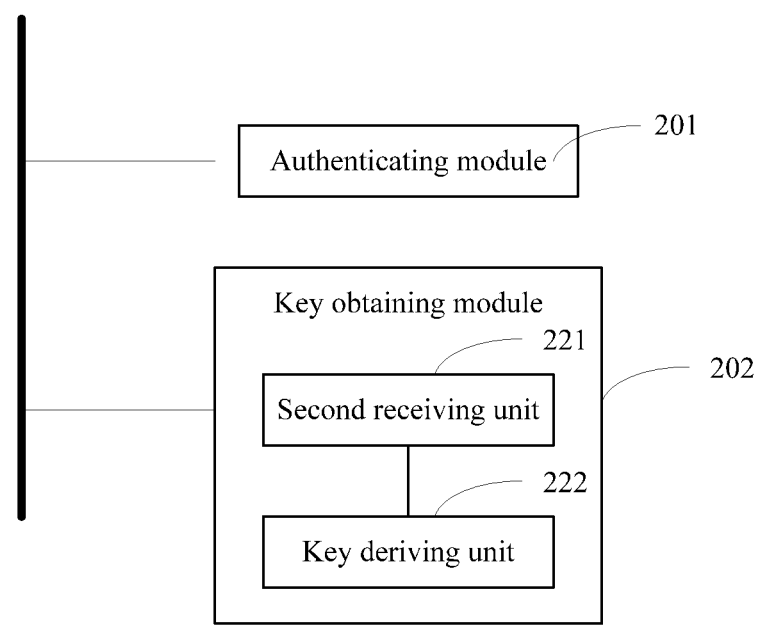
FIG. 22 is a schematic diagram of a basic logical structure of an MTC device according to the third embodiment of the present invention.

The key obtaining module 202 according to the embodiment shown in FIG. 20 may include a second receiving unit 221 and a key deriving unit 222, as shown in FIG. 22.

The second receiving unit 221 is configured to receive a key algorithm A2 and a key K1 which is delivered by the MTC gateway or the key K2 which is delivered by the MTC gateway.

The key deriving unit 222 is configured to generate the non access stratum link protection key K between the MTC device and the core network node according to the key algorithm A2 received by the second receiving unit 221 and the key K1, or according to the key algorithm A2 received by the second receiving unit 221 and the key K2.

Figure 23:
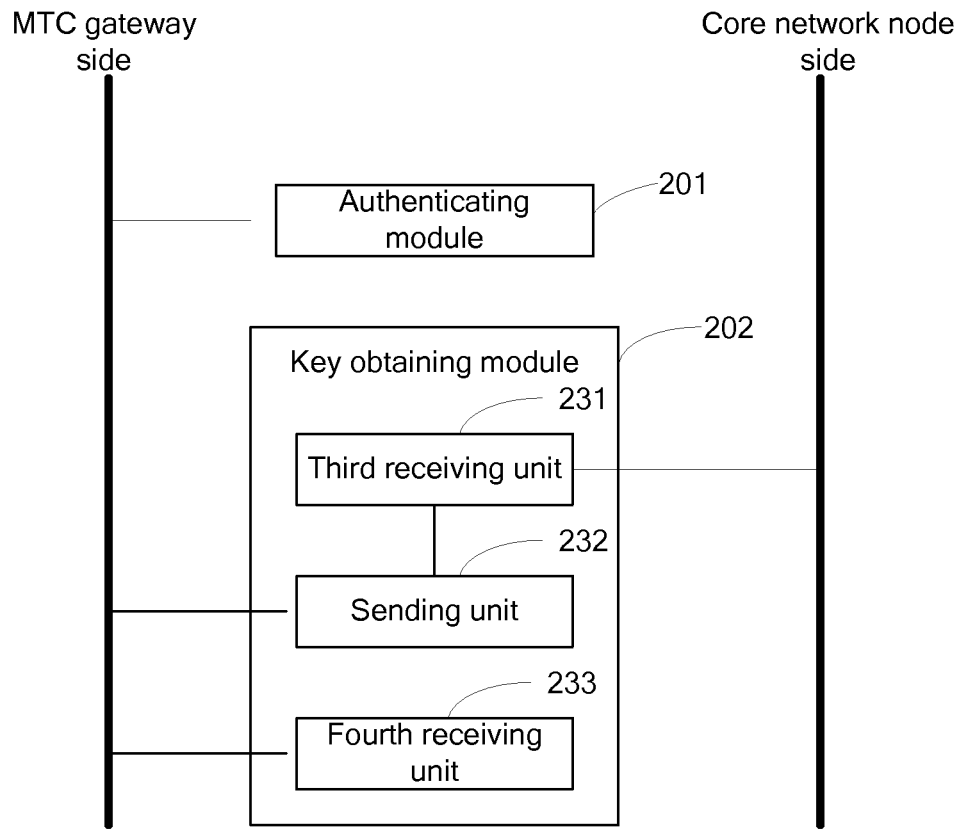
FIG. 23 is a schematic diagram of a basic logical structure of an MTC device according to the fourth embodiment of the present invention.

The key obtaining module 202 in the embodiment shown in FIG. 20 may include a third receiving unit 231, a sending unit 232, and a fourth receiving unit 233, as shown in FIG. 23.

The third receiving unit 231 is configured to receive the key algorithm A2.

The sending unit 232 is configured to send the key algorithm A2 received by the third receiving unit 231 to the MTC gateway.

The fourth receiving unit 233 is configured to receive a key K3 delivered by the MTC gateway.

Figure 24:
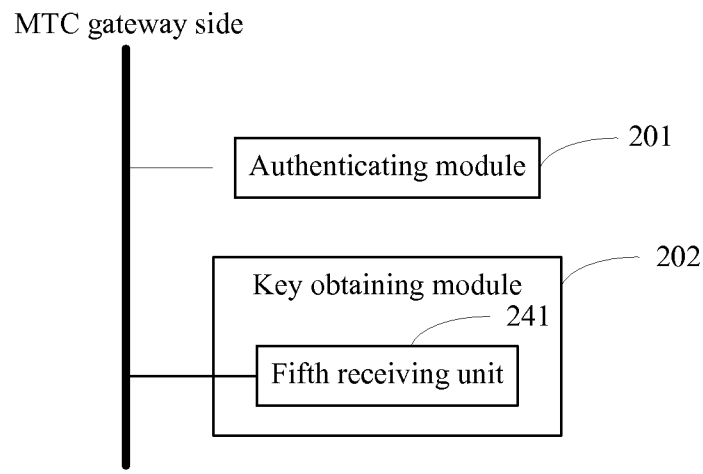
FIG. 24 is a schematic diagram of a basic logical structure of an MTC device according to the fifth embodiment of the present invention.

The key obtaining module 202 in the embodiment shown in FIG. 20 may include a fifth receiving unit 241, which is as shown in FIG. 24, and is configured to receive the key K3 delivered by the MTC gateway.

In the embodiment shown in FIG. 20 to FIG. 24, the key algorithm A2 is a key algorithm selected by the core network node for the MTC device after the core network node receives an authentication result of mutual authentication between the MTC gateway and the MTC device, the key K2 is a non access stratum key derived according to the key K1 when the MTC gateway performs the mutual authentication with the core network node, the key K1 is generated in a process of the mutual authentication between the MTC gateway and the core network node, and the key K3 is derived by the MTC gateway according to the key algorithm A2 and the key K1, or according to the key algorithm A2 and the key K2.

It should be noted that, content such as information interaction between the modules/units of the foregoing devices, execution processes and technical effects is based on a same idea as that of the method embodiments of the present invention, reference may be made to the description of the method embodiments of the present invention for specific content, which is not repeatedly described here.

Persons of ordinary skill in the art may understand that all or part of the steps in the methods according to the foregoing embodiments may be implemented by a program instructing relevant hardware. The program may be stored in a computer readable storage medium, where the storage medium may include: a read only memory (ROM, Read Only Memory), a random access memory (RAM, Random Access Memory), a magnetic disk, or a compact disk, and so on.

The foregoing describes the MTC device authentication method, the MTC gateway, and the related device according to the embodiments of the present invention in detail, the principles and implementation manners of the present invention are explained through specific examples, and the description of the foregoing embodiments is only used to help understanding of the methods and a core idea of the present invention; meanwhile, persons of ordinary skill in the art may make modifications to a specific implementation manner and the application scope according to the idea of the present invention. To sum up, the content of the specification shall not be construed as a limitation to the present invention.

What is claimed is:

1. A machine type communication (MTC) device authentication method, comprising:
    performing, by an MTC gateway, mutual authentication with a core network node;
    performing, by the MTC gateway, mutual authentication with an MTC device;
    reporting, by the MTC gateway, a result of the mutual authentication with the MTC device to the core network node;
    providing, by the MTC gateway, a non access stratum link protection key K between the MTC device and the core network node according to keys K1, K2 and K3, wherein:
        the key K1 is a key generated in a process of the mutual authentication performed by the MTC gateway and the core network node, and the key K2 is a non access stratum key derived by the MTC gateway according to a key algorithm A1 and the key K1, and
        the key K3 is a non access stratum key K3 derived by the MTC gateway according to a key algorithm A2 and the key K2, wherein the key algorithms A1 and A2 are different key generation algorithms; and
    delivering, by the MTC gateway, the non access stratum key K3 as the non access stratum link protection key K between the MTC device and the core network node, to the MTC device,
    wherein the key algorithm A2 is a key algorithm selected by the core network node for the MTC device after the core network node receives an authentication result of the mutual authentication between the MTC gateway and the MTC device.

2. The method according to claim 1, wherein after the MTC gateway provides the non access stratum link protection key K to the MTC device, the method further comprises:
    providing, by the MTC gateway, an access stratum link protection key between the MTC gateway and a radio access network node according to the key K1.

3. The method according to claim 2, wherein the providing, by the MTC gateway, the access stratum link protection key between the MTC gateway and the radio access network node according to the key K1 comprises:
    obtaining, by the MTC gateway, a count value Ncount1 of a message counter provided by the MTC device, wherein the count value Ncount1 of the message counter is a value obtained by counting messages exchanged in a process of interaction between the MTC device and the core network node;
    deriving, by the MTC gateway, a key KeNB according to the count value Ncount1 of the message counter and the key K1; and
    deriving, by the MTC gateway, the access stratum link protection key between the MTC gateway and the radio access network node according to the key KeNB.

4. The method according to claim 2, wherein the providing, by the MTC gateway, the access stratum link protection key between the MTC gateway and the radio access network node according to the key K1 comprises:
    obtaining, by the MTC gateway, a count value Ncount1 of a message counter provided by the MTC device, wherein the count value Ncount1 of the message counter is a value obtained by counting messages exchanged in a process of interaction between the MTC device and the core network node;
    obtaining, by the MTC gateway, a device identity of the MTC device;
    deriving, by the MTC gateway, a key KeNB according to the count value Ncount1 of the message counter, the key K1, and the device identity of the MTC device; and
    deriving, by the MTC gateway, the access stratum link protection key between the MTC gateway and the radio access network node according to the key KeNB.

5. The method according to claim 2, wherein the providing, by the MTC gateway, the access stratum link protection key between the MTC gateway and the radio access network node according to the key K1 comprises:
    deriving, by the MTC gateway, a key KeNB according to a count value Ncount2 of a message counter and the key 1, wherein the count value Ncount2 of the message counter is a value obtained by counting messages exchanged in a process of interaction between the MTC gateway and the core network node; and
    deriving, by the MTC gateway, the access stratum link protection key between the MTC gateway and the radio access network node according to the key KeNB.

6. The method according to claim 1, wherein:
    the non access stratum link protection key K is used to protect data transferred on a non access stratum link.

7. The method according to claim 2, wherein:
the access stratum link protection key is used to protect data transferred on an access stratum link.

8. An device authentication method, comprising:
performing, by a core network node, mutual authentication with a machine type communication (MTC) gateway;
receiving, by the core network node, a result of mutual authentication between the MTC gateway and an MTC device sent by the MTC gateway;
providing, by the core network node, a non access stratum link protection key K between the MTC device and the core network node according to keys K1, K2 and K3; wherein:
the key K1 is a key generated in a process of the mutual authentication performed by the core network node and the MTC gateway, and the key K2 is a non access stratum key derived by the core network node according to a key algorithm A1 and the key K1; and
deriving, by the core network node, the non access stratum link protection key K between the MTC device and the core network node according to a key algorithm A2 and the key K2 by:
delivering, by the core network node, the key algorithm A2 to the MTC gateway or the MTC device, so that the MTC gateway or the MTC device generates the non access stratum link protection key K between the MTC device and the core network node according to the key algorithm A2,
the key K3 is a non access stratum key K3 as the non access stratum link protection key K between the MC device and the core network node, derived by the MTC gateway or the MTC device according to the key algorithm A2 and the key K2, wherein the key algorithms A1 and A2 are different key generation algorithms, and
the key algorithm A2 is a key algorithm selected by the core network node for the MTC device after the core network node receives the authentication result of the mutual authentication between the MTC gateway and the MTC device.

9. A machine type communication (MTC) device authentication method, comprising:
performing, by the MTC device, mutual authentication with an MTC gateway; and
obtaining, by the MTC device, a non access stratum link protection key K between the MTC device and a core network node according to keys K1, K2 and K3 after the MTC gateway performs mutual authentication with the core network node and reports a result of the mutual authentication between the MTC gateway and the MTC device to the core network node,
wherein the obtaining, by the MTC device, the non access stratum link protection key K between the MTC device and the core network node comprises:
receiving, by the MTC device, a key algorithm A2;
sending, by the MTC device, the key algorithm A2 to the MTC gateway; and
receiving, by the MTC device, a key K3 delivered by the MTC gateway, and using the key K3 as the non access stratum link protection key K between the MTC device and the core network node, wherein:
the key K3 is a non access stratum key derived by the MTC gateway according to the key algorithm A2 and a key K2, the key K2 is a non access stratum key derived by the MTC gateway according to a key algorithm A1 and a key K1, and the key K1 is generated in a process of the mutual authentication between the MTC gateway and the core network node; or
wherein the obtaining, by the MTC device, the non access stratum link protection key K between the MTC device and the core network node comprises:
receiving, by the MTC device, a key K3 delivered by the MTC gateway, and using the key K3 as the non access stratum link protection key K between the MTC device and the core network node, wherein:
the key K3 is a non access stratum key derived by the MTC gateway according to the key algorithm A2 and a key K2, the key K2 is a non access stratum key derived by the MTC gateway according to a key algorithm A1 and a key K1, and the key K1 is generated in a process of the mutual authentication between the MTC gateway and the core network node;
wherein the key algorithms A1 and A2 are different key generation algorithms and the key algorithm A2 is a key algorithm selected by the core network node for the MTC device after the core network node receives the authentication result of the mutual authentication between the MTC gateway and the MTC device.

10. A gateway, comprising:
an authenticating module, configured to perform mutual authentication with a core network node and perform mutual authentication with a machine type communication (MTC) device;
a reporting module, configured to report a result of the mutual authentication between the authenticating module and the MTC device to the core network node; and
a key providing module, configured to provide a non access stratum link protection key K between the MTC device and the core network node according to keys K1, K2 and K3, wherein:
the key K1 is a key generated in a process of the mutual authentication performed by the authenticating module with the core network node, and the key K2 is a key derived by the gateway according to a key algorithm A1 and the key K1, and
the key K3 is a non access stratum key K3 derived according to a key algorithm A2 and the key K2, wherein the key algorithms A1 and A2 are different key generation algorithms;
wherein the key providing module delivers the non access stratum key K3 as the non access stratum link protection key K between the MTC device and the core network node, to the MTC device; and
wherein the key algorithm A2 is a key algorithm selected by the core network node for the MTC device after the core network node receives an authentication result of the mutual authentication between the MTC gateway and the MTC device.

11. A core network node, comprising:
an authenticating module, configured to perform mutual authentication with an MTC gateway;
a receiving module, configured to receive a result of mutual authentication between the MTC gateway and an MTC device; and
a key providing module, configured to provide a non access stratum link protection key K between the MTC device and the core network node according to keys K1, K2 and K3, and to derive the non access stratum link protection key K between the MTC device and the core network node according to a key algorithm A2 and the key K2 by:

delivering the key algorithm A2 to the MTC gateway or the MTC device, so that the MTC gateway or the MTC device generates the non access stratum link protection key K between the MTC device and the core network node according to the key algorithm A2, the key K3 is a non access stratum key K3 as the non access stratum link protection key K between the MC device and the core network node, derived by the MTC gateway or the MTC device according to the key algorithm A2 and the key K2, wherein the key algorithms A1 and A2 are different key generation algorithms, and the key algorithm A2 is a key algorithm selected by the core network node for the MTC device after the core network node receives the authentication result of the mutual authentication between the MTC gateway and the MTC device.

12. A machine type communication (MTC) device, comprising:

an authenticating module, configured to perform mutual authentication with an MTC gateway; and a key obtaining module, configured to obtain a non access stratum link protection key K between the MTC device and a core network node according to keys K1, K2 and K3 after the MTC gateway performs mutual authentication with the core network node and reports a result of the mutual authentication with the authenticating module to the core network node, wherein the key obtaining module obtains the non access stratum link protection key K between the MTC device and the core network node by:

receiving a key algorithm A2;

sending the key algorithm A2 to the MTC gateway; and receiving a key K3 delivered by the MTC gateway, and using the key K3 as the non access stratum link protection key K between the MTC device and the core network node, wherein:

the key K3 is a non access stratum key derived by the MTC gateway according to the key algorithm A2 and a key K2, the key K2 is a non access stratum key derived by the MTC gateway according to a key algorithm A1 and a key K1, and the key K1 is generated in a process of the mutual authentication between the MTC gateway and the core network node; or wherein the key obtaining module obtains the non access stratum link protection key K between the MTC device and the core network node by:

receiving a key K3 delivered by the MTC gateway, and using the key K3 as the non access stratum link protection key K between the MTC device and the core network node; wherein:

the key K3 is a non access stratum key derived by the MTC gateway according to the key algorithm A2 and a key K2, the key K2 is a non access stratum key derived by the MTC gateway according to a key algorithm A1 and a key K1, and the key K1 is generated in a process of the mutual authentication between the MTC gateway and the core network node;

wherein the key algorithms A1 and A2 are different key generation algorithms and the key algorithm A2 is a key algorithm selected by the core network node for the MTC device after the core network node receives the authentication result of the mutual authentication between the MTC gateway and the MTC device.

* * * * *